United States Patent
Inoue et al.

(10) Patent No.: US 6,582,013 B1
(45) Date of Patent: Jun. 24, 2003

(54) VEHICULAR CEILING ASSEMBLING STRUCTURE, A UNIT ASSEMBLY USED FOR THE SAME, A FRAME MEMBER USED FOR THE SAME, AND A VEHICULAR CEILING ASSEMBLING METHOD

(75) Inventors: Takuya Inoue, Nagoya (JP); Yasuyo Matsumoto, Nagoya (JP); Nobutaka Hamanishi, Nagoya (JP); Koji Murakami, Yokkaichi (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/706,784

(22) Filed: Nov. 7, 2000

(30) Foreign Application Priority Data

Nov. 9, 1999 (JP) .......................... 11-318862
Nov. 9, 1999 (JP) .......................... 11-318863
Nov. 9, 1999 (JP) .......................... 11-318864

(51) Int. Cl.$^7$ .................................. B60J 7/04
(52) U.S. Cl. ............. 296/214; 296/216.07; 296/219.09
(58) Field of Search ........................... 296/210, 214, 296/216.01, 216.04, 223, 216.06, 216.07, 216.08, 216.09; 362/493, 488, 490, 546

(56) References Cited

U.S. PATENT DOCUMENTS

| | | | | |
|---|---|---|---|---|
| 4,119,794 A | * | 10/1978 | Matsuki ...................... 296/210 |
| 4,640,184 A | * | 2/1987 | Matsushima et al. ....... 454/137 |
| 4,703,400 A | * | 10/1987 | Vescio et al. ............... 248/27.3 |
| 5,357,408 A | * | 10/1994 | Lecznar et al. ............. 296/214 |
| 5,484,186 A | * | 1/1996 | Van Order et al. ......... 296/214 |
| 5,664,827 A | * | 9/1997 | Mori et al. .................. 296/214 |
| 5,688,022 A | * | 11/1997 | Adams et al. ............... 296/214 |
| 5,695,238 A | * | 12/1997 | Calamari et al. ........... 296/210 |
| 5,825,096 A | * | 10/1998 | Morimoto et al. ........... 307/9.1 |
| 5,856,635 A | * | 1/1999 | Fujisawa et al. .............. 16/2.1 |
| 5,975,935 A | * | 11/1999 | Yamaguchi et al. ......... 439/374 |
| 6,036,259 A | * | 3/2000 | Hertel et al. ........... 296/216.01 |
| 6,056,423 A | * | 5/2000 | Takano et al. ............... 362/488 |
| 6,095,840 A | * | 8/2000 | Yamaguchi et al. ......... 362/523 |
| 6,107,569 A | | 8/2000 | Shields et al. |
| 6,120,091 A | * | 9/2000 | Reich et al. ................. 296/214 |
| 6,126,228 A | * | 10/2000 | Davis et al. ................. 296/214 |
| 6,273,499 B1 | * | 8/2001 | Guyon ........................ 296/214 |

FOREIGN PATENT DOCUMENTS

| | | | | |
|---|---|---|---|---|
| EP | 0241939 A1 | | 10/1987 | |
| EP | 0346154 A2 | | 12/1989 | |
| GB | 2220392 A | * | 1/1990 | .................. 296/214 |
| GB | 2335397 A | | 9/1999 | |
| JP | 5-131882 | | 5/1993 | |
| WO | WO 99/12770 | | 3/1999 | |

* cited by examiner

Primary Examiner—D. Glenn Dayoan
Assistant Examiner—Jason Morrow
(74) Attorney, Agent, or Firm—Oliff & Berridge, PLC

(57) ABSTRACT

In a structure for assembling lamps 30 to 32 and a wire harness for those lamps onto a body ceiling 2 of a vehicle body 1, the lamps 30 to 32 and the wire harness for the lamps are assembled to a sub-frame 25 in advance, and electrically connected to each other in advance. In the assembling work, the sub-frame 25 is assembled to the body ceiling 2 of the vehicle body 1, whereby the lamps 30 to 32 and the wire harness for the lamps are assembled to the body ceiling 2 by one assembling work.

24 Claims, 25 Drawing Sheets

VEHICULAR CEILING ASSEMBLING STRUCTURE, A UNIT ASSEMBLY USED FOR THE SAME, A FRAME MEMBER USED FOR THE SAME, AND A VEHICULAR CEILING ASSEMBLING METHOD

BACKGROUND OF THE INVENTION

The present invention relates to a vehicular ceiling assembling structure for assembling electric devices, such as lamps, and a molded ceiling onto the underside of a body ceiling of a vehicle body, a unit assembly used for the same, a frame member used for the same, and a vehicular ceiling assembling method.

A sun roof unit, various electric devices, such as a room lamp, a wire harness for those electric devices, and a molded ceiling are mounted on the underside of a body ceiling of a vehicle body. Those components are generally assembled onto the body ceiling in the following way.

A wire harness is laid on a body ceiling of a vehicle body. A sun roof unit is fastened to the body ceiling. The sun roof unit is connected to the wire harness by a connector. Then, a molded ceiling is laid under the sun roof unit and fastened to the body ceiling. A part of the wire harness is taken out through an opening used for assembling the lamps, which is formed in the molded ceiling. Then, the room lamp and the wire harness are connected by a connector. Thereafter, the room lamp is fastened to the body ceiling, through the opening.

The assembling work must be done in a narrow space within the vehicular body, and the worker must take an upward facing posture. Accordingly, the workability is considerably poor. In the work of connecting the wire harness and the electric devices by a connector, the defective assembling is easily caused. For example, insufficient fitting or coupling of the parts or components is likely to occur.

In a recent vehicular ceiling assembling method as disclosed in JP-A-5-131882, for example, to lessen the work in an upward facing position, the wire harness is laid in advance on the molded ceiling, whereby there is eliminated the work of laying the wire harness alone.

In this method, only the wire harness is assembled to the molded ceiling. In other words, no other electric devices than the wire harness are assembled to the molded ceiling. What we want to say is that the molded ceiling is exposed within the car cabin. Accordingly, its materials are limited to those fabric materials. Any of those materials is too small in strength to mount the electric devices to its product. Therefore, also where this method is used, such electric devices as room lamps must be assembled one by one in the upward facing position. For this reason, the vehicular ceiling assembling method is still unsatisfactory in achieving the improvement of the workability and the eliminating of the defective assembling.

Further, the present invention relates to a structure and method for installing a wiring harness along a car body.

In a case where a wiring harness is installed along the body of a vehicle, a wiring harness has hitherto usually been installed along a predetermined route and is secured on the body through use of custom-designed clamps. Alternatively, electric cables constituting a wire harness are usually secured on the body through use of a double-sided adhesive tape or an adhesive.

The conventional construction for installing a wiring harness requires custom-designed fixing members, such as clamps or double-sided tapes, in addition to the wiring harness. The weight of such fixing members increases the overall weight of the body of a vehicle and becomes a detriment to a reduction in the weight of the vehicle body.

Recently, a module has been built by means of mounting electrical components and a wiring harness therefor on a constituent component of the vehicle body beforehand. Modules are mounted on the body of a vehicle in an automobile assembly line, thereby improving ease of assembly. A module of this type encounters problems in reducing weight and costs.

Even in connection with the foregoing construction for installing a wiring harness, demand exists for reviewing the construction in order to reduce vehicle weight and cost.

Still further, the present invention relates to a vehicular ceiling assembling structure for assembling an illuminating device, such as a room lamp, and a molded ceiling onto the underside of a body ceiling of a vehicle body, and a vehicular ceiling assembling method.

Usually, lamps (illuminating devices), such as a room lamp and a map lamp, a wire harness for those lamps, and a molded ceiling are mounted on the underside of a body ceiling of a vehicle body. A structure for assembling those to the body ceiling is generally constructed as shown in FIG. 37.

A wire harness 361 is laid on the underside of a body ceiling 360, and a molded ceiling 362 is assembled onto the body ceiling 360 to cover the body ceiling 360 and the wire harness 361. A lamp 364 is located on the underside of the molded ceiling, and is electrically connected to the wire harness 361 through an opening 363 formed in the molded ceiling 362, and the lamp 364 is fastened to the body ceiling 360 by means of a bolt 365, through the opening 363.

The opening 363 formed in the molded ceiling 362 is much smaller than the lamp 364. When the lamp 364 is assembled from the under side of the molded ceiling, the lamp 364 is covered with the lamp 364, whereby an external appearance of the ceiling portion is kept good.

In the vehicular ceiling assembling structure described above, the lamp 364 and the like are assembled in the following way.

The wire harness 361 is first laid on the body ceiling 360 of the vehicle body, and the molded ceiling 362 is located under the wire harness 361, and those are assembled to the body ceiling 360. A part of the wire harness 361 is taken out through the opening 363 of the molded ceiling 362, and the lamp 364 and the wire harness 361 are connected together by a connector. And the lamp 364 is fastened to the body ceiling 360 by means of the bolt 365, through the opening 363.

In the conventional assembling structure as mentioned above, in assembling the lamp, the worker seeks the connector through the opening 363, and takes out the connector and the wire harness 361 as well through the opening 363, and connects them to the lamp 364. Further, he fixes the lamp 364 to the body ceiling 360 while pushing back the wire harness 361 to the upper side of the molded ceiling 362, through the opening 363. Therefore, the connection work is very complicated and troublesome.

Since the connector must be taken out through the opening 363 as described above, a take-out part is additionally provided on the wire harness 361. It frequently occurs that the take-out part bites the wire harness 361.

Further, the take-out part of the wire harness 361 vibrates during the running of the vehicle to possibly generate abnormal sound.

SUMMARY OF THE INVENTION

Accordingly, a first object of the present invention is to provide a vehicular ceiling assembling structure which improves the workability and can reliably prevent the occurrence of defective assembling. A second object of the present invention is to provide a unit assembly and a frame member, which are suitable for the vehicular ceiling assembling structure. A third object of the present invention is to a vehicular ceiling assembling method which improves the workability and can reliably prevent the occurrence of defective assembling.

To achieve the above object, there is provided a vehicular ceiling assembling structure for assembling electric devices, such as lamps, and a molded ceiling onto a body ceiling of a vehicle body, a frame member to which electric devices and a wire harness for the electric devices are assembled is mounted on the underside of the molded ceiling, and the molded ceiling is mounted on the body ceiling in a state that the molded ceiling is disposed under the frame member (aspect 1).

In the thus constructed assembling structure, in the vehicular ceiling assembling work, the electric devices and the wire harness for those electric devices are assembled to the frame member in a predetermined arrangement. As a result, the electric devices and the wire harness for those electric devices are assembled to the body ceiling by one assembling work by merely assembling the frame member to the body ceiling. Accordingly, the assembling work is considerably simple when comparing with the case where the electric devices and the wire harness are separately assembled to the body ceiling.

In the assembling structure, the frame member, when bulky, will affect the size of a room space. In this respect, it is preferable that the frame member is entirely shaped like a thin plate (aspect 2).

Where the vehicle body includes a sun roof, it is preferable that a sun roof unit including a sun roof and a drive mechanism for the sun roof is assembled to the frame member (aspect 3). By so doing, by the assembling of the frame member, the sun roof unit may additionally be assembled to the body ceiling. Accordingly, there is no need of the work of assembling the sun roof unit alone.

A vehicular ceiling assembling structure according to aspect 3, wherein the frame member includes a front portion extending in the widthwise direction of a vehicle body in the vicinity of the front pillars of the body ceiling, a pair of side portions extending to the rear side of the vehicle body from both ends of the front portion as viewed in the widthwise direction, and a center portion for coupling together the paired side portions at a mid position as viewed in the longitudinal direction of the vehicle body, wherein an opening for the sun roof is defined by the front portion, the side portions and the center portion, and a map lamp is assembled as the electric device to the front portion, and a room lamp is assembled as a electric device to the center portion (aspect 4). In the thus constructed frame member, the center portion is detachable from the side portions, and attachable to the side portions at a plurality of positions as viewed in the longitudinal direction of the vehicle body (aspect 5). With such a construction, when a position of the room lamp of one type of vehicle is different form that of the room lamp of another type of the vehicle, the position of the center portion may be changed to another according to the lamp location. Accordingly, one frame member may be applied to different types of vehicles.

In the structure for laying the wire harness in the frame member, a wire harness consisting of a flat cable is laid as the wire harness on the frame member, internal conductors of the flat cable are exposed at positions where the electric devices are assembled, the electric devices are provided with plate-spring like terminals, and the terminals come in resilient contact with the internal conductors at the positions where the internal conductors of the flat cable are exposed (aspect 6).

The structure allows the electric device to electrically be connected to the wire harness by merely assembling the electric device to the frame member.

In another structure of laying the wire harness in the frame member, groove-like paths in which electric wires forming the wire harness are to be put are formed in the frame member, and the wire harness is laid on the frame member by putting the electric wires into the paths (aspect 7). In this structure, the wire harness may be fixed to the frame member by merely wiring the electric wires along and in the paths when the wire harness is laid onto the frame member.

In yet another structure of laying the wire harness in the frame member, groove-like paths in which electric wires forming the wire harness are to be put are formed in the frame member, press contacting blades to be inserted into the paths are provided in the electric devices, and the electric device is pressingly connected to the electric wires of the wire harness when the electric wires are laid along and in the paths in a state that the electric devices are assembled into the frame member (aspect 8).

In this structure, the wire harness is fixed to the frame member by merely wiring the electric wires along and in the paths when the wire harness is laid on the frame member, and further the wire harness may electrically be connected to the electric devices.

A unit assembly constructed according to the invention is a unit assembly to be assembled to a body ceiling of a vehicle body, wherein electric devices and a wire harness for the electric devices, which are to be assembled to the body ceiling, are assembled to a frame member which may be assembled to the body ceiling in a state that the electric devices and the wire harness are electrically connected to each other, and the electric devices and the wire harness are disposed at predetermined positions on the body ceiling by assembling the frame member to a predetermined position of the body ceiling (aspect 9).

Where such a unit assembly is used, in the vehicular ceiling assembling work, the electric devices and the wire harness for the same may be assembled to the body ceiling by merely assembling the unit assemble to the body ceiling. Accordingly, there is no need of the work of assembling the electric devices and the wire harness for the same separately.

In the unit assembly, a sun roof unit including a sun roof and a drive mechanism for the sun roof may be assembled as the electric device to the frame member (aspect 10). With this construction, when the unit member is assembled to the body ceiling, the sun roof unit is also assembled simultaneously. Accordingly, there is no need of the work of assembling the sun roof unit alone.

A frame member of the invention is defined such that in an assembling medium for assembling electric devices and a wire harness for the same, which are disposed on a body ceiling of a vehicle body, a frame member includes a front portion extending in the widthwise direction of a vehicle body in the vicinity of the front pillars of the body ceiling in a state that the front portion is assembled to the body ceiling, the front portion which is made of metal or resin, has a rigidity as a whole, and may be assembled to the body ceiling, a pair of side portions extending to the rear side of the vehicle body from both ends of the front portion as viewed in the widthwise direction, and a center portion for coupling together the paired side portions at a mid position as viewed in the longitudinal direction of the vehicle body (aspect 11).

In the frame member, general electric devices such as a room lamp, a map lamp and a vanity lamp, and a wire harness for those devices may well be assembled. Further, an opening for the sun roof may also be secured. For this reason, the frame member is suitable for the vehicular ceiling assembling structures mentioned above and the unit assemblies also mentioned above.

The frame member, when bulky, will affect the size of the room space. Therefore, it is preferable that a frame member according to aspect 11, wherein the frame member is entirely shaped like a thin plate (aspect 12). Further, to cope with the different lamp positions in different types of vehicles, it is preferable that the center portion is detachable from the side portions, and attachable to the side portions at a plurality of positions as viewed in the longitudinal direction of the vehicle body (aspect 13).

According to the invention, there is provided a vehicular ceiling assembling method for assembling electric devices, such as lamps, and a molded ceiling onto a body ceiling of a vehicle body, comprising the steps of: assembling electric devices and a wire harness for the electric devices to a frame member which may be assembled to the body ceiling, and electrically connecting the electric devices and the wire harness; assembling the frame member to the body ceiling, whereby the frame member and the body ceiling are assembled to the body ceiling; and disposing a molded ceiling under the frame member and assembling the molded ceiling to the body ceiling (aspect 14).

Accordingly, the electric devices and the wire harness for those electric devices are assembled to the body ceiling by one assembling work by merely assembling the frame member to the body ceiling. Therefore, the assembling work is considerably simple when comparing with the case where the electric devices and the wire harness are separately assembled to the body ceiling.

A sun roof unit including a sun roof and a drive mechanism for the sun roof may be assembled in advance to the unit member (aspect 15). If so done, there is no need of the work of assembling the sun roof unit alone to the body ceiling.

In the vehicular ceiling assembling method, the electric devices may be assembled to the underside of the frame member, whereby press contacting blades provided on the electric devices are passed through the frame member while being directed upward, and in laying the wire harness onto the frame member, electric wires forming the wire harness are pressingly connected to the press contacting blades (aspect 16). If so done, the laying of the wire harness to the frame member and the electrical connection of the electric devices and the wire harness may be carried out concurrently.

Further, the present invention has been conceived in view of the foregoing problem and is aimed at providing a construction and method of installing a wiring harness which enables reductions in the weight of a vehicle body and costs.

Accordingly, the present invention provides a construction for installing a wiring harness, along a predetermined route, on an area of a vehicle which is made of resin and on which the wiring harness is to be installed, comprising:

bare wires used as electrical wires for constituting the wiring harness, wherein the area is melt and welded to the electrical wires, as a result of which the wiring harness is fixed on the body of the vehicle (aspect 17).

Since the electrical wires constituting the wiring harness are formed from conductors, and the wiring harness is directly fixed to the area on which the wiring harness is to be installed, by means of welding. Hence, the wiring harness according to the present invention is advantageous over a wiring harness which is formed from coated electrical wires and is fixed through use of custom-designed clamps, in terms of reductions in the weight of the body of a vehicle and costs.

Further, the present invention provides a construction for installing a wiring harness, along a predetermined route, on an area of a vehicle which is made of resin and on which the wiring harness is to be installed, comprising:

coated electrical wires used as electrical wires for constituting the wiring harness, wherein a sheath of the electrical wires is removed at specific positions of the electrical wires such that internal conductors are exposed, and the area is melt such that the portions of the electrical wires where exposed portions of the internal conductors are welded to the area, thus fixing the wiring harness to the body of the vehicle (aspect 18).

Since the wiring harness is fixed directly to the area where the wiring harness is to be installed, by means of welding, the wiring harness according to the present invention is advantageous over a wiring harness which is formed from coated electrical wires and is fixed through use of custom-designed clamps, in terms of reductions in the weight of the body of a vehicle and costs.

Preferably, in a case where a vehicle is assembled by means of installing a wiring harness on constituent elements of the body of a vehicle beforehand and mounting the constituent elements on the body, the portion of the constituent elements of the body made of resin may be selected as the area on which the wiring harness is to be mounted. The wiring harness may be installed on the thus-selected area.

More specifically, the present invention is effective in a case where a frame member partially formed from resin is mounted on a roof of the body as the constituent elements, where electrical components such as a courtesy lamp are mounted on the frame member, and where the wiring harness for use with the electrical components is installed as the wiring harness (aspect 20). Such a construction for installing a roof of a vehicle encounters problems in reducing the weight of a frame member (while electrical components are mounted on the frame member). Accordingly, the construction for installing a wiring harness according to the present invention is effective for use with a construction for assembling the roof of a vehicle.

The present invention provides a method of installing a wiring harness, along a predetermined route, on an area of the body of a vehicle made of resin, the method comprising the steps of:

installing electrical wires constituting the wiring harness on the area along the predetermined route; and pressing the electrical wires against the area during the installment of the electrical wires, while an electric current is applied to the electrical wires so as to generate heat, thereby welding the electrical wires to the area (aspect 21).

Preferably, bare wires may be used as the electrical wires for constituting the wiring harness, and the electrical wires may be welded to the area on which the wiring harness is to be mounted, by means of pressing the electrical wires against the area while an electric current is supplied to the electrical wires (aspect 22). Preferably, coated electrical wires may be used as electrical wires for constituting the wiring harness; a sheath of the electrical wires may be removed at specific positions of the electrical wires such that internal conductors are exposed; and the electrical wires may be welded to the area on which the wiring harness is to be mounted, by means of pressing the exposed portions of internal conductors against the area while an electric current is supplied to the electrical wires (aspect 23).

Under the method according to the present invention, electrical wires can be fixed to the area on which the wiring harness is to be installed without involvement of efforts, by means of supplying an electric current to the electrical wires during installment of the electrical wires (aspect 24). Therefore, ease of an operation for installing a wiring harness can be improved. After installment of the wiring harness, there can be obtained the construction for installing a wiring harness according to the present invention. Further, according to the foregoing method, there can be obtained the construction for installing a wiring harness according to the present invention. Therefore, the construction yields a working-operation and advantages.

Preferably, the electrical wires are pressed against the area by means of a press member formed from conductive material, and either the electrical wires or the press member are (is) connected to a positive electrode of a supply source, and the counterpart of the electrical wires or the press member is connected to a negative electrode of the supply source, so that an electric current flows to the electrical wires only when the electrical wires are pressed by the press member.

As a result, interruption of supply of an electric current can be linked to an operation for pressing electrical wires. Therefore, the labor required for interrupting supply of an electric current is obviated, thus improving the ease of an operation for installing a wiring harness.

Preferably, the method is applied to a case where there is assembled a vehicle by means of installing a wiring harness on constituent elements of the body of a vehicle beforehand and mounting the constituent elements on the body, the portion of the constituent elements of the body made of resin may be selected as the area on which the wiring harness is to be mounted, and the wiring harness may be installed on the selected area (aspect 25).

Accordingly, an object of the present invention is to provide a vehicular ceiling assembling structure and a vehicular ceiling assembling method which is capable of securing a good external appearance of the ceiling portion, improving the workability in assembling the vehicle ceiling, and preventing defective assembling and generation of abnormal sound when the vehicle runs.

To achieve the above object, there is provided a vehicular ceiling assembling structure in which an illuminating device and a molded ceiling are assembled onto the underside of a body ceiling of a vehicle body and the illuminating device faces the under side of the molded ceiling through an opening of each illuminating device, the opening of the molded ceiling is slightly smaller than a specific portion of the illuminating device, and the circumferential edge of the opening is fit to a groove formed in and along the circumference of the specific portion of the illuminating device (aspect 26).

In the vehicular ceiling assembling structure thus constructed, in the vehicular ceiling assembling work, the illuminating device is assembled to the body ceiling in advance, and the circumferential edge of the opening is fit to the groove of the illuminating device while fitting the take-out part of the illuminating device into the opening of the molded ceiling. When so done, the circumferential edge of the opening of the molded ceiling is hidden within the groove. Accordingly, the outer appearance of the ceiling portion is kept good although the illuminating device is assembled before the molded ceiling is assembled. In a case where the illuminating device comprises a main body to be assembled to the body ceiling and a cover coupled to the lower end of the main body, the groove is formed in the cover (aspect 27).

According to another aspect, there is provided a vehicular ceiling assembling structure in which an illuminating device and a molded ceiling are assembled onto the underside of a body ceiling of a vehicle body, wherein the illuminating device comprises a main body to be assembled to the body ceiling and a cover that may be coupled to the lower end of the main body, the cover is coupled to the main body through an opening formed in the molded ceiling from the under side of the molded ceiling, and the cover is larger than the opening of the molded ceiling (aspect 28).

In the vehicular ceiling assembling structure thus constructed, in the vehicular ceiling assembling work, the illuminating device is assembled to the body ceiling in advance, and the cover is coupled to the main body through the opening formed in the molded ceiling. By so doing, the circumferential edge of the opening of the molded ceiling is covered with the cover. Accordingly, the outer appearance of the ceiling portion is kept good although the illuminating device is assembled before the molded ceiling is assembled.

Where a size relation of the opening of the molded ceiling relative to the main body requires such a construction that the main body of the illuminating device is smaller than the opening of the molded ceiling, the lower end of the illuminating device is coupled to the cover while facing the inside of the opening (aspect 29). Where the main body of the illuminating device is smaller than the opening of the molded ceiling, the cover is coupled to the main body through the opening of the molded ceiling, whereby the circumferential edge of the opening of the molded ceiling is sandwiched between the main body and the cover (aspect 30).

According to a further aspect of the invention, there is provided a vehicular ceiling assembling method for assembling an illuminating device and a molded ceiling onto the underside of a body ceiling of a vehicle body, wherein the illuminating device and a wire harness for the illuminating device are assembled onto the body ceiling, thereby electrically connecting the illuminating device to the wire harness, thereafter the molded ceiling is located under the assembled ones, and a specific portion of the illuminating device is fit to an opening formed in the molded ceiling, whereby the specific portion faces the under side of the molded ceiling, and the opening of the molded ceiling is fit into a groove formed in and along the circumference of the specific portion of the illuminating device (aspect 31).

In this method, the assembling of the illuminating device and the electrical connection of the illuminating device to the wire harness are performed before the assembling of the molded ceiling. Therefore, the assembling work of the illuminating device is more easy and accurate when comparing with the assembling where the illuminating device is assembled after the molded ceiling is assembled.

According to another aspect of the invention, there is provided a vehicular ceiling assembling method for assembling an illuminating device and a molded ceiling onto the underside of a body ceiling of a vehicle body, wherein a main body of the illuminating device and a wire harness for the illuminating device are assembled onto the body ceiling, thereby electrically connecting the illuminating device to the wire harness, thereafter the molded ceiling is located under the assembled ones, and assembled onto the body ceiling, and a cover larger than the opening is coupled to the main body from the under side of the molded ceiling, through an opening formed in the molded ceiling (aspect 32).

In this method, the assembling of the main body of the illuminating device and the electrical connection of the main body to the wire harness are performed before the assembling of the molded ceiling. Therefore, the assembling work of the illuminating device is more easy and accurate when comparing with the assembling method where the illuminating device is assembled after the molded ceiling is assembled.

DETAILED DESCRIPTION OF THE PREFERRED EMBODIMENTS

The preferred embodiments of the present invention will be described with reference to the accompanying drawings.

Figure 1:
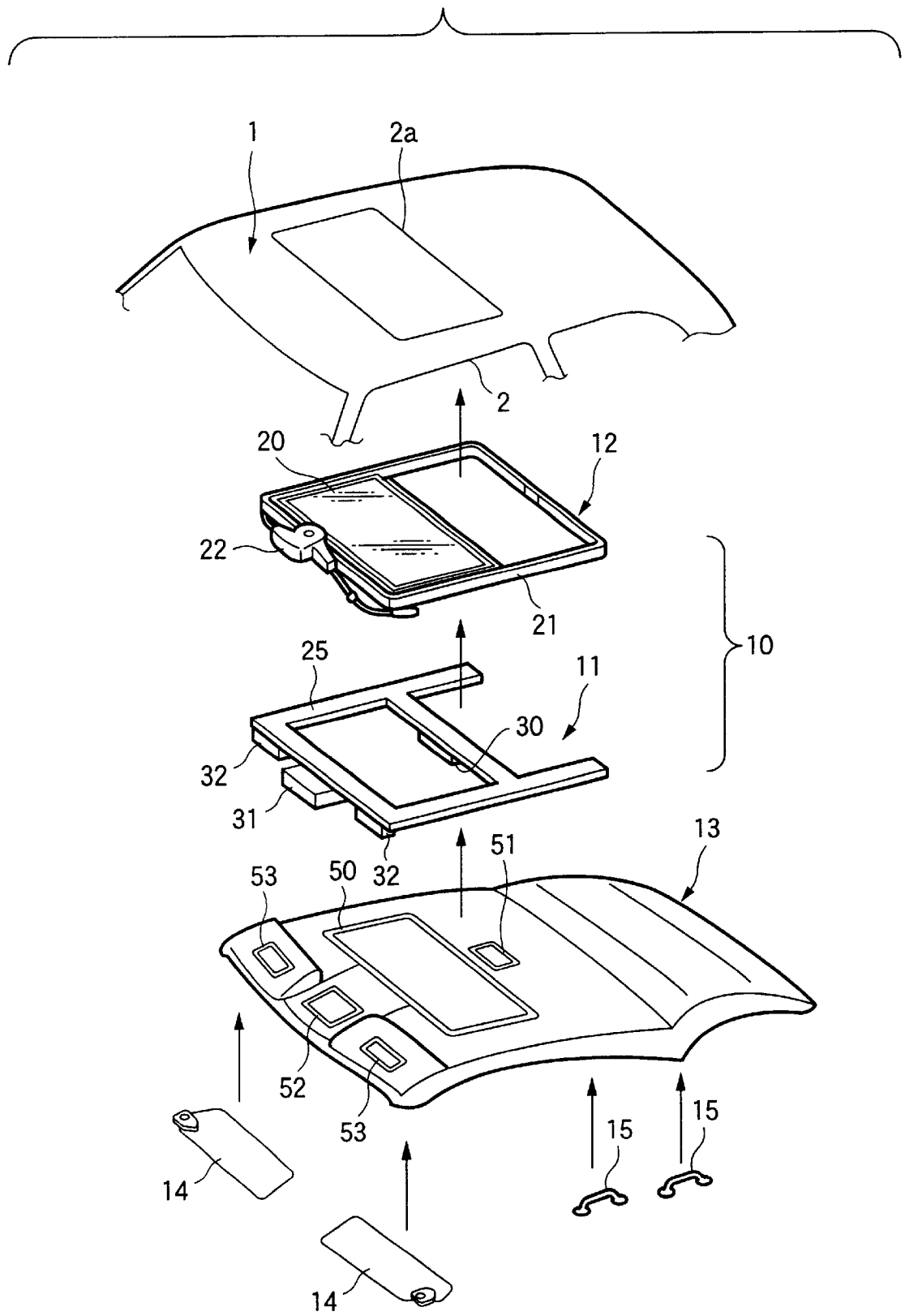
FIG. 1 is an exploded view showing a vehicular ceiling assembling structure using a vehicular ceiling illuminating device, which is constructed according to the present invention.

FIG. 1 is an exploded view showing a vehicular ceiling assembling structure which is constructed according to the present invention. A vehicle body 1 illustrated is provided with a sun roof, and an opening portion 2a for the sun roof is formed in a body ceiling 2. A unit assembly 10, a molded ceiling 13, sun visors 14 and assist grips 15 are assembled onto the underside (room side) of the body ceiling 2.

The unit assembly 10 is formed with a sub-frame unit 11 and a sun roof unit 12. The sun roof unit 12 and the subframe unit 11 are coupled together to form a unitary construction in a state that the former is located on the upper side (body ceiling side) and the latter is located on the lower side.

Figure 2:
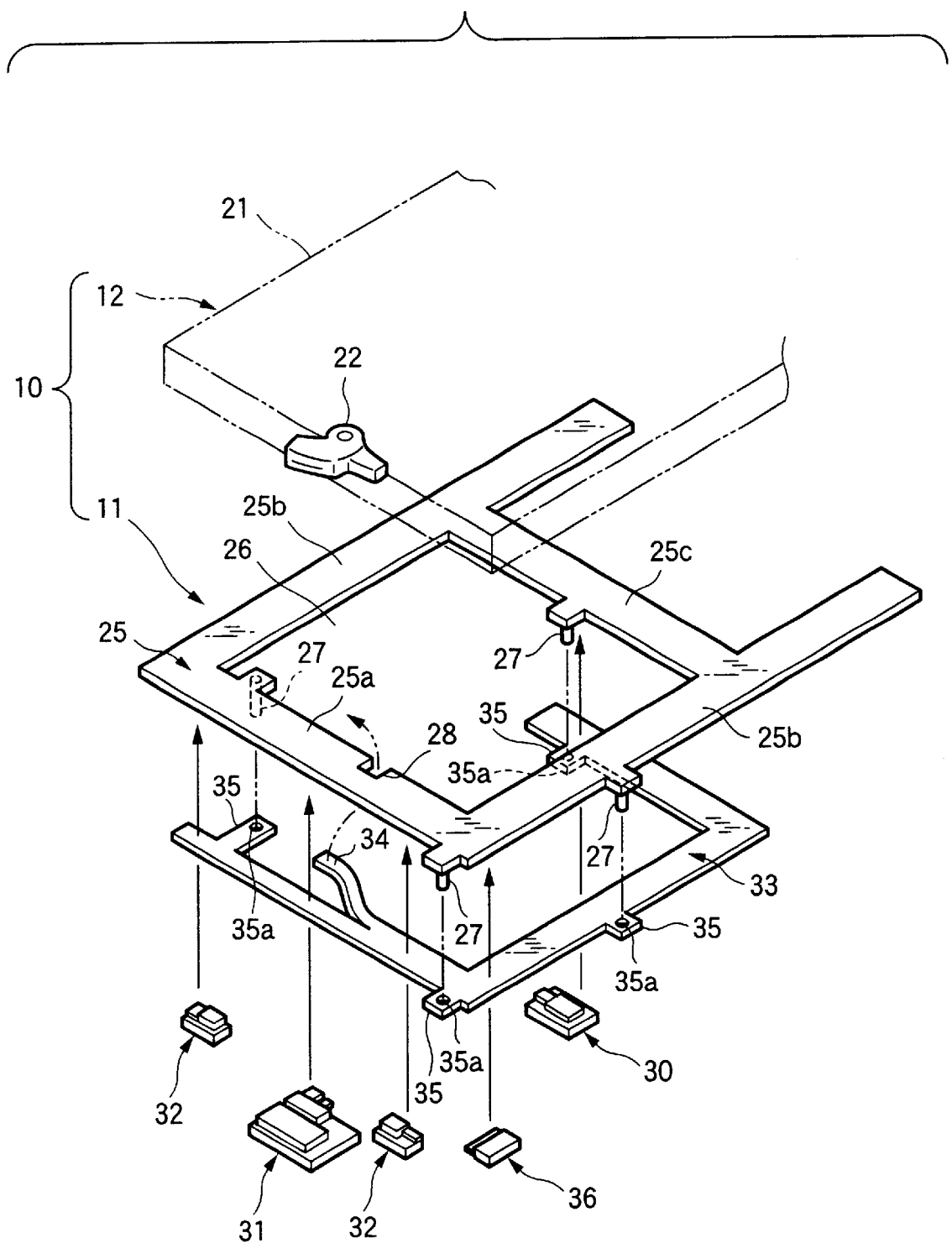
FIG. 2 is an exploded view showing a structure of a unit assembly.

The unit assembly 10, as shown in FIG. 2, includes a sub-frame 25 (frame member). Various types of electric devices, components and such (referred frequently to as electric devices), and a wire harness 33 for those electric devices, components and such are assembled to the sub-frame 25. Examples of those electric devices/components are a room lamp 30, a map lamp 31, and a pair of vanity lamps 32, and a connector 36 for connecting the wire harness 33 to a wire harness of the vehicle cabin.

The sub-frame 25 is a thin plate-like member made of a hard resin, such as acrylonitrile-butadinene-styrene (ABS) or polyethylene (PE). The sub-frame is configured based on a layout of those lamps 30 to 32 and wiring routes of the wire harness 33. Specifically, the sub-frame comprises a front portion 25a which extends in the widthwise direction of the vehicle body 1 in the vicinity of the front pillar of the vehicle body 1, a pair of side portions 25b which extends from both ends of the front portion 25a as viewed in the widthwise direction in the rearward direction of the vehicle body, and a center portion 25c which couples together the side portions 25b at the mid position of the vehicle body 1 when viewed in the longitudinal direction of the vehicle body 1. An opening 26 for the sun roof is defined by the front portion 25a, the side portions 25b and the center portion 25c.

The map lamp 31, the vanity lamps 32 and the connector 36 are assembled to the lower side of the front portion 25a, and the room lamp 30 is assembled to the lower side of the center portion 25c. The wire harness 33 is laid along the lower sides of those portions 25a to 25c, while extending to the lamps 30 to 32 and the connector 36, whereby it is electrically connected to the lamps 30 to 32 and the like.

To assemble the lamps 30 to 32 and the like, and the wire harness 33 to the sub-frame 25, the wire harness 33 is first mounted on the sub-frame 25, and then the lamps 30 to 32 and the like are mounted on the sub-frame 25, while being laid on the wire harness 33. Specifically, the lamps 30 to 32 and the like are assembled onto the sub-frame 25 in the following way.

Figure 3:
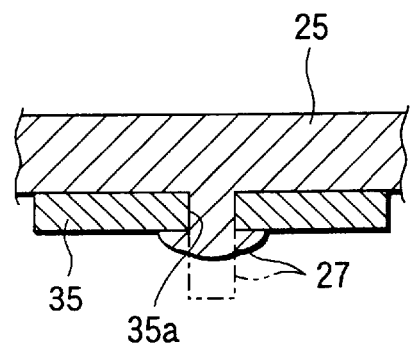
FIG. 3 is a longitudinal sectional view showing a structure for fixing a wire harness to a sub-frame.

In the present embodiment, the wire harness 33 is formed with a flat cable, and has mounting pieces 35 with through-holes 35a formed at appropriate locations. Protruded pieces 27, directed downwardly, are formed at locations of the sub-frame 25 corresponding to the mounting pieces 35, while being arranged along the extending path of the wire harness 33. The wire harness 33 is laid on the sub-frame 25 along a predetermined path. The protruded pieces 27 are inserted into the through-holes 35a of the mounting pieces 35. The protruded pieces 27 are caulked so as to firmly hold the mounting pieces 35, as shown in FIG. 3. Specifically, the tips of the protruded pieces 27 are heated and crushed, so that the wire harness 33 is fastened to the sub-frame 25. The method of fixing the wire harness 33 to the sub-frame 25 is not limited to the above-mentioned one. Instead of this method, other fixing methods may be used which use bolts, double-coated tape or adhesive.

Figure 4:
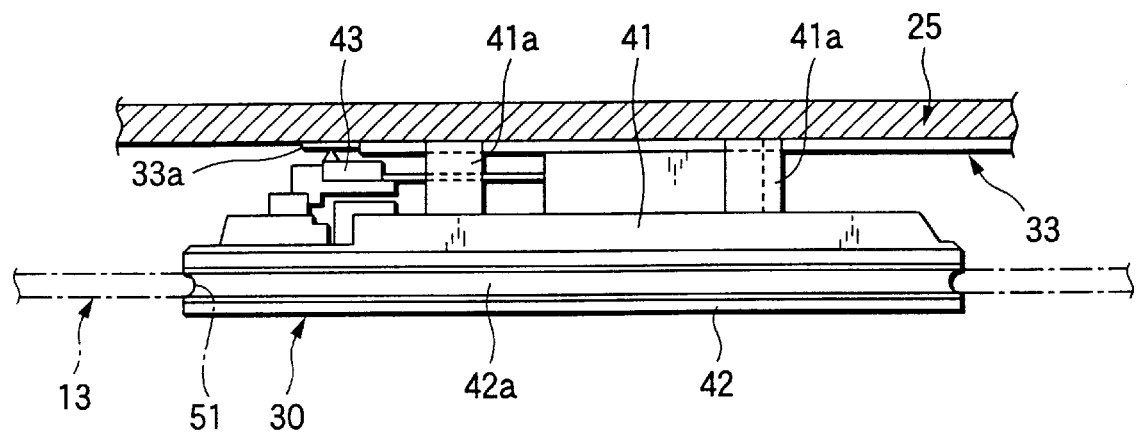
FIG. 4 is a side view (cross sectional view in part) showing a construction of a room lamp and a connection structure for electrically connecting the room lamp to the wire harness.

Meanwhile, the lamps 30 to 32 are fastened to the sub-frame 25 by means of bolts. This will be described in detail by using the room lamp 30 as a typical example. The room lamp 30, as shown in FIG. 4, comprises a main body 41 including a bulb, a switch circuit and others, and a lamp cover 42 mounted on the underside of the main body 41. A plurality of cylindrical ribs 41a are protruded from the surface of the main body 41 which is to be coupled to the sub-frame 25. The room lamp 30 is positioned at predetermined assembling positions of the sub-frame 25 by those cylindrical ribs 41a, while interposing the wire harness 33 located therebetween. In this state, bolts are applied from the underside of the room lamp 30 to the assembly through the cylindrical ribs 41a, so that the room lamp 30 is assembled to the sub-frame 25.

With regard to the electrical connection of the room lamp 30 to the wire harness 33, a terminal 43 like a plate spring is provided on the main body 41, as shown. An internal conductor 33a of the wire harness 33 is exposed at the mounting position of the room lamp 30. When the room lamp 30 is assembled to the sub-frame 25 as described above, the terminal 43 is brought into contact with the internal conductor 33a by an elastic force of the terminal 43. In this way, the room lamp 30 is electrically connected to the wire harness 33. Description is given here on the room lamp 30. The map lamp 31 and the vanity lamps 32 are also each constructed like the room lamp 30. The mounting of them onto the sub-frame 25 and the electrical connection of them to the wire harness 33 are carried out as in the case of the room lamp 30. The connector 36, while not illustrated in detail, will be described on its structure. The connector 36 is constructed such that a part of the connector is exposed to outside through the connection housing. The internal conductor 33a of the wire harness 33 is exposed at the mounting position of the connector 36. When the connector 36 is assembled to the sub-frame 25, the connector terminal comes in contact with the internal conductor 33a. As a result, the connector 36 is electrically connected to the wire harness 33.

The sun roof unit 12, as shown in FIG. 1, includes a frame 21. A sun roof 20 formed with smoke glass or the like is assembled to the frame 21, while being slidable. Further, a drive mechanism with a motor 22 as a drive source, which is for driving the roof or the like, is assembled to the frame 21. The sun roof unit is assembled to the upper surface of the sub-frame 25 of the sub-frame unit 11 by means of bolts or the like, although not illustrated.

A power source for driving the sun roof unit 12 and control signals to the same are applied thereto through the wire harness 33. The sun roof unit 12 and the wire harness 33 are electrically interconnected in the following way.

As shown in FIG. 2, the wire harness 33 includes a branch line 34, which is branched from the main line, at a location of its portion laid along the front portion 25a of the sub-frame 25. The branch line 34 is led to the upper surface of the sub-frame 25 through a cutout portion 28 of the front portion 25a. The internal conductor is exposed at this portion by removing the covering of this portion (see FIG. 5C). A plate-spring like terminal is provided on the surface of the sun roof unit 12 to be mounted on the sub-frame 25, as in the case of the room lamp 30. When the sun roof unit 12 is assembled to the upper surface of the sub-frame 25 as described above, the pressing contact terminal of the sun roof unit 12 comes in contact with the internal conductor of the branch line 34, so that the sun roof unit 12 is electrically connected to the wire harness 33.

The molded ceiling 13 is made of synthetic resin or the like. As shown in FIG. 1, an opening 50 for the sun roof is formed in the central portion of the molded ceiling. Openings 51 to 53 for the lamps, while corresponding to the lamps 30 to 32, are formed in the front and rear portions of the vehicle body 1 with respect to the sun-roof opening 50. The lamps 30 to 32 are directed to the inside of the vehicle cabin, through the openings 51 to 53.

The openings 51 to 53 are somewhat smaller than the covers of the lamps 30 to 32, respectively. The circumferential edges of the lamp openings 51 to 53 are fit into the grooves of the lamps 30 to 32, respectively, so that the circumferential edges of the lamp openings 51 to 53 are hidden and the external appearance is kept good within the car cabin. In the case of the room lamp 30, for example, as shown in FIG. 4, a recess 42a is formed in the entire circumference of the lamp cover 42. The circumferential edge of the lamp opening 51 is fit into this recess 42a. The same thing is correspondingly applied to the structure of each of the map lamp 31 and the vanity lamps 32, although not illustrated.

Work of assembling the thus constructed vehicle ceiling will be described with reference to FIGS. 5 and 6.

In the ceiling assembling work, the unit assembly 10 is constructed in advance.

Figure 5A:
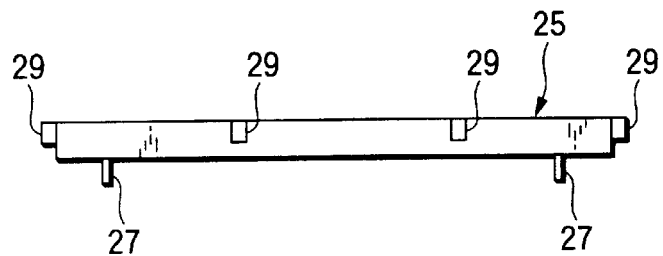
FIG. 5 is a process diagram useful in explaining a vehicular ceiling assembling structure.
Figure 5B:
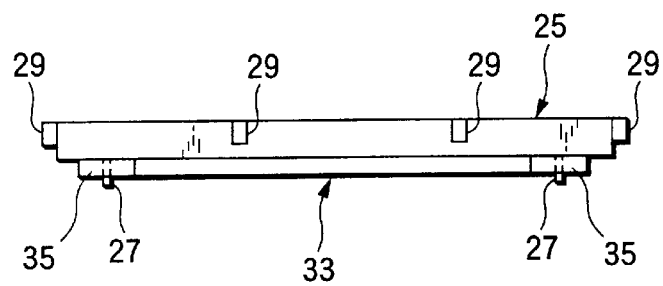
Figure 5C:
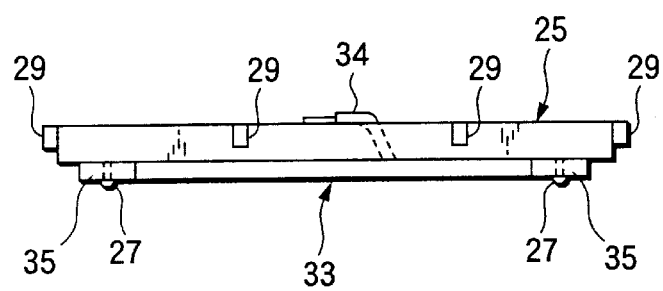

In assembling the unit assembly 10, as shown in FIGS. 5A and 5B, the wire harness 33 is laid on the underside of the sub-frame 25. The wire harness 33, as described above, is laid such that the wire harness 33 is placed on and along the sub-frame 25 while securing a predetermined path, and the protruded pieces 27 of the sub-frame 25 are inserted into the mounting pieces 35 of the wire harness 33 (FIG. 5C). In this case, the branch line 34 of the wire harness 33 is previously led to the upper side of the sub-frame 25. In the figure, reference numeral 29 indicates cylindrical ribs for assembling, which are used for assembling the unit assembly 10 to the body ceiling 2.

Figure 5D:
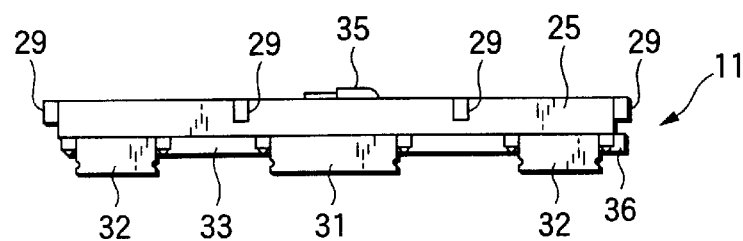

Then, as shown in FIG. 5D, the lamps 30 to 32 and the connector 36 are attached to predetermined positions on the underside of the sub-frame. When the lamps 30 to 32 and the connector 36 are thus attached to the sub-frame, the terminals of the lamps 30 to 32 are brought into contact with the internal conductor of the wire harness 33. As a result, the lamps 30 to 32 are electrically connected to the wire harness 33. Here, the assembling work of a sub-frame unit 11 is completed. It is suggestible to assemble the sub-frame unit 11 in the following manner. Mounting pieces 35 are placed upside down on a worktable or the like. In this state it is fixed thereon. Then, a wire harness 33 is laid and the lamps 30 to 32 are assembled thereto. By so doing, the worker can assemble them in an easy position and efficiently.

Figure 5E:
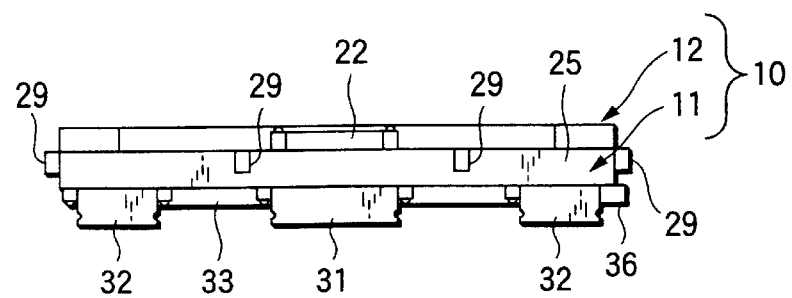

Following the completion of the sub-frame unit 11, as shown in FIG. 5E, the sun roof unit 12 already assembled is assembled to the upper surface of the sub-frame of the sub-frame unit 11. When the sun roof unit 12 is thus assembled to the sub-frame unit, the pressing-contact terminal is brought into contact with the internal conductor of the wire harness 33 (branch portion 34), as described above. As a result, the sun roof unit 12 is electrically connected to the wire harness 33. Here, a unit assembly 10 is completed.

Figure 6A:
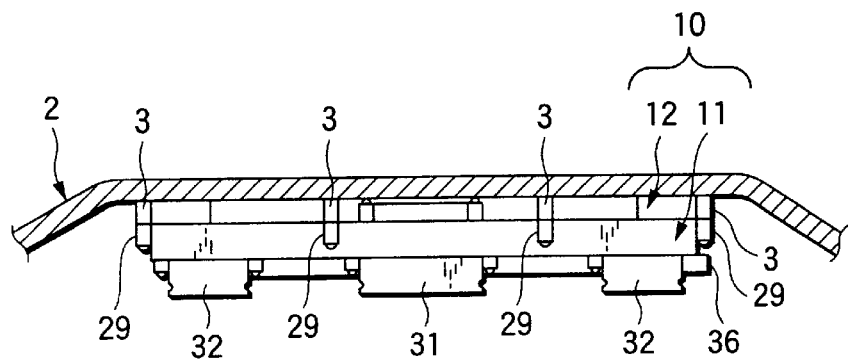
FIG. 6 is another process diagram useful in explaining a vehicular ceiling assembling structure.

In the work (main work) of assembling the vehicle ceiling to the vehicle body, the unit assembly 10 already assembled as described above is assembled to the body ceiling 2 as shown in FIG. 6A. Specifically, the unit assembly 10 is positioned to a predetermined location of the body ceiling 2, and fastened to fixing portions 3 of the body ceiling 2 by means of bolts, with the aid of assembling ribs 29.

Figure 6B:
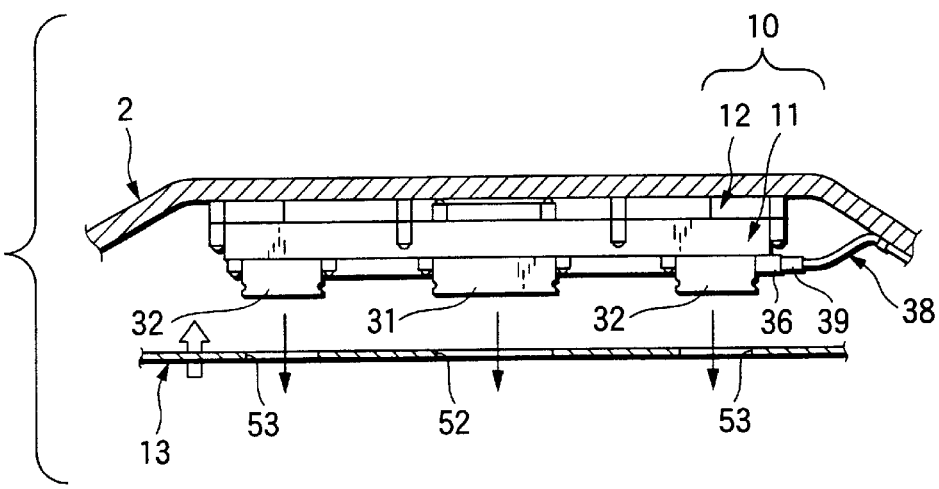

Subsequently, as shown in FIG. 6B, a wire harness 38 for the vehicle cabin is laid along the front pillars of the vehicle body 1, and a connector 39 for connection of the wire harness 38 is coupled to the connector 36 of the unit assembly 10. The wire harness 38 may be laid before the unit assembly 10 is assembled to the body ceiling 2.

Figure 6C:
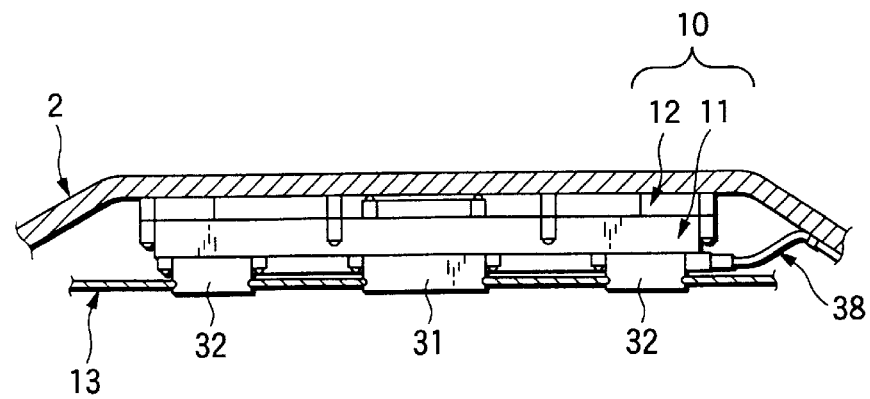

Then, the molded ceiling 13 is laid on the underside of the unit assembly 10 and those are fastened together by means of bolts. As shown in FIG. 6C, the lamps 30 to 32 are directed to the inside (lower side in the figure) of the vehicle cabin through the lamp openings 51 to 53, which are formed in the molded ceiling 13. At this time, as described above, the circumferential edges of the openings 51 to 53 of the molded ceiling 13 are fit into the grooves formed in the lamp covers of the lamps 30 to 32, respectively, whereby the circumferential edges are hidden.

After the assembling work for the molded ceiling 13 is completed, the sun visors 14 and the assist grips 15 are fastened to the body ceiling 2 by means of bolts from the outer side (facing the inner side of the vehicle cabin) of the molded ceiling 13. Here, the assembling work of the vehicle ceiling to the vehicle body is completed.

In the vehicular ceiling assembling structure thus constructed, in the vehicular ceiling assembling work, the sun roof unit 12, the various lamps 30 to 32, and the wire harness 33 for those electric devices/components may be assembled to the body ceiling 2 by one assembling work by merely mounting the unit assembly 10 to the body ceiling 2. Therefore, the number of assembling steps in the vehicular ceiling assembling work is remarkably reduced, and further a chance of working in the upward facing position is considerably reduced. As a result, the workability in the assembling work is substantially improved.

Since the work by the worker with his face upward is reduced, occurrence of the defective assembling will be infrequent. In particular the electrical connection of the electric devices and components such as the lamps 30 to 32 and the wire harness 33 may be done before the assembling of them to the body ceiling 2. When comparing with the conventional vehicular ceiling assembling which needs the assembling work by the worker with his face upward, the electric connection work of the lamps 30 to 32 and to the wire harness 33 can be done more accurately and reliably.

There is a fear that the vehicular ceiling assembling structure mentioned above will suffer from a disadvantage that provision of the sub-frame 25 leads to reduction of the room space. Since the sub-frame 25 takes the form of a thin plate, and the flat cable is used for the wire harness 33, the size of the sub-frame unit 11 is not increased. Accordingly, the provision of the sub-frame 25 little affects the size of the room space, and hence it is possible to secure the room space comparable with the conventional one.

It is clear that various modifications of the vehicular ceiling assembling structure mentioned above are present. Examples of such will be given below.

A. Sub-frame 25

(1) The sub-frame 25 may be formed of a metallic material. In this case, it is preferable that a metallic material of light weight, such as aluminum, is used to avoid the increase the weight of the resultant product. It is not essential that the sub-frame 25 is a thin plate. However, increase of the space occupied by the sub-frame 25 will affect the room space in size. In this sense, the use of a thin plate for the sub-frame 25 is preferable.

(2) In the vehicle not using the sun roof, there is no need of forming the sun-roof opening 26 in the sub-frame 25. In this case, accordingly, only the assembling positions of the lamps 30 to 32 are taken into account in design, and a T-shaped sub-frame 25 may be used which consists a front portion widthwise extending between the front pillars and a portion extending from the mid position between the front pillars to the back side of the vehicle body 1. What is essential in configuration design of the sub-frame 25 is that the sub-frame is configured appropriately according to the assembling positions of the electric devices and components and the path along which the wire harness is laid.

(3) The sub-frame 25 may be designed such that its center position 25c is movable in the longitudinal direction of the vehicle body 1.

Specifically, the room lamp 30 is coupled to the center portion 25c as in the conventional case. For the same type of vehicles, the position of the room lamp 30 in the vehicle body 1 having the sun roof is different from that of the room lamp in the vehicle body not having the sunroof. Accordingly, the sub-frame 25 whose center portion 25c is movable has an advantage that it is available for both the vehicle body 1 having the sun roof and the vehicle body 1 not having the sun roof.

Figure 7:
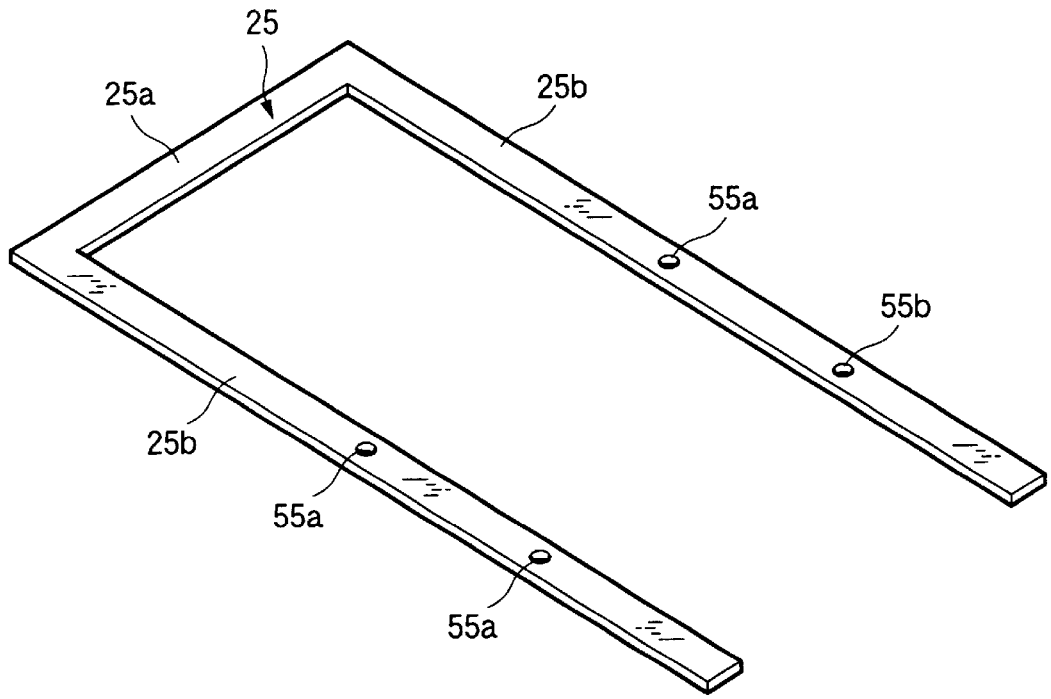
FIG. 7 is a perspective view showing a modification of the sub-frame.
Figure 8:
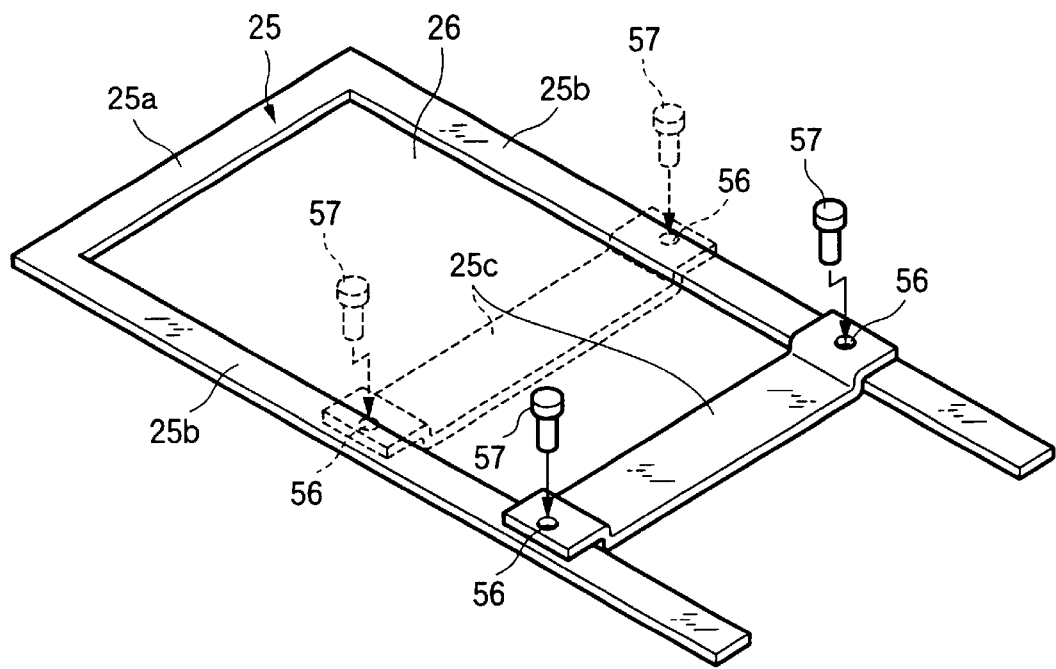
FIG. 8 is a perspective view showing the modification of the sub-frame.
Figure 9:
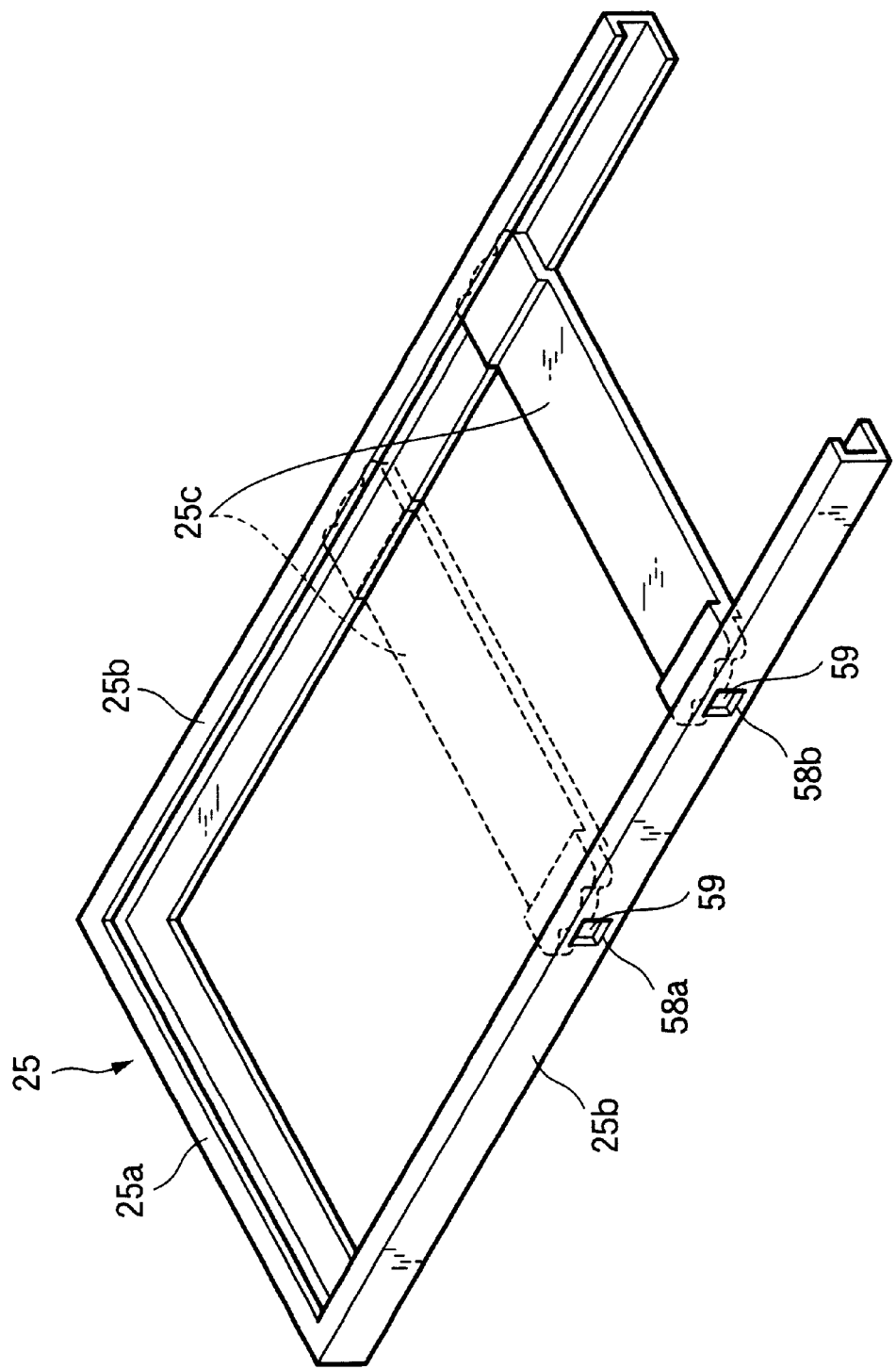
FIG. 9 is a perspective view showing another modification of the sub-frame.

An exemplary construction of the sub-frame 25 whose center portion 25c is movable will specifically be described hereunder. The center portion 25c is constructed as a separate member. As specific example of it is shown in FIG. 7. As shown, a pair of bolt holes 55a and 55b used for mounting the center portion, which are applicable to both the vehicle bodies 1 having the sun roof and not having the same, are formed in each side portion 25b at positions spaced longitudinally (in the front and rear directions of the vehicle body 1). As shown in FIG. 8, bolts 57 are passed through mounting holes 56 formed at both ends of the center portion 25c, and then are selectively screwed into paired bolt holes 55a or 55b. Where the sub-frame thus constructed is used, the position of the center portion 25c may be changed to another in a simple manner. Another construction of the sub-frame is shown in FIG. 9. As shown, the side portions 25b are shaped like U in cross section. Paired openings 58a and 58b, which correspond to vehicle bodies 1 having and not having the sun roof, are formed in the side walls of the side portions 25b at positions spaced a predetermined distance from each other. Protruded pieces 59 are provided at both ends of the center portion 25c. The center portion 25c is mounted on the side portions 25b by inserting the protruded pieces 59 into the paired openings 58a or 58b. With this structure, the center portion 25c may be assembled to the side portions 25b without using bolts. This results in an easy assembling of the sub-frame 25.

B. Laying of the Wire Harness 33 and an Electrical Connection Structure (1) The following construction may be used. A wire harness, generally used, is used for the wire harness 33. The lamps 30 to 32 and the like are coupled to the wire harness 33 by fitting a connector to related locations, whereby electrical connection of the wire harness is set up.

(2) In the case (1) above, groove-like paths in which individual electric wires forming the wire harness 33 are to be laid may be formed in the sub-frame 25, and those wires are press fit into the paths and held therein. If so constructed, the laying of the wire harness 33 and the fixing of the wire harness 33 may concurrently be carried out. As a result, the workability in the laying of the wire harness is improved.

(3) The electric devices such as the room lamp 30 are provided with press contacting blades, and are brought into press-contact with the wire harness 33, whereby the electric connection of them is set up. A specific exemplary construction of this will be described hereunder.

Figure 10:
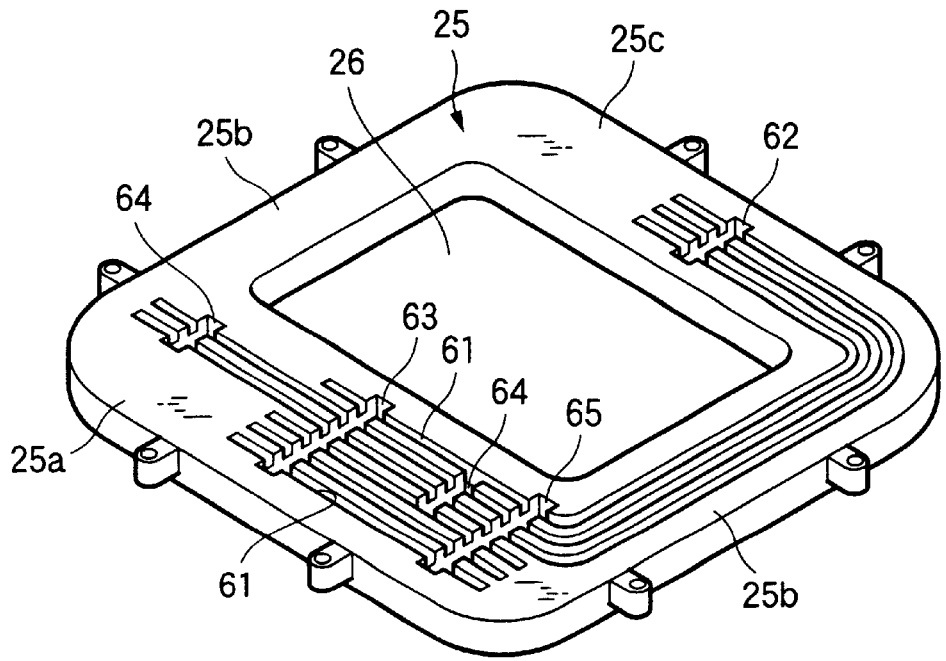
FIG. 10 is a perspective view showing a modification of a structure for laying the wire harness onto the sub-frame, and a sub-frame used for a structure for pressingly connecting the electric devices to the wire harness.
Figure 12:
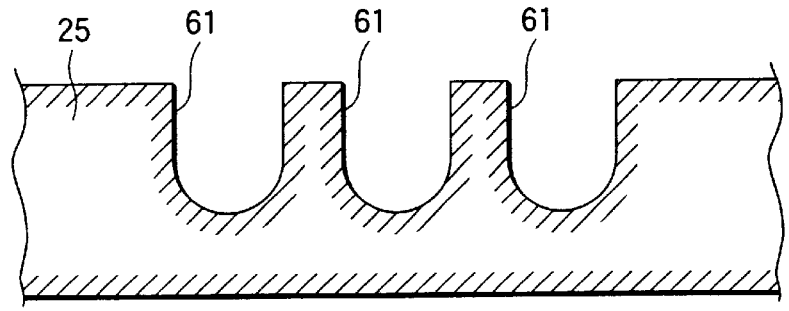
FIG. 12 is a cross sectional view showing the sub-frame for explaining wiring paths of electric wires.

As shown in FIGS. 10 and 12, groove-like paths 61 in which electric wires are to be laid are formed in the upper surface of the sub-frame 25. Further, through-holes 62 to 65 are bored through the paths at positions corresponding to the assembling positions of the lamps 30 to 32 and the connector 36.

Figure 11:
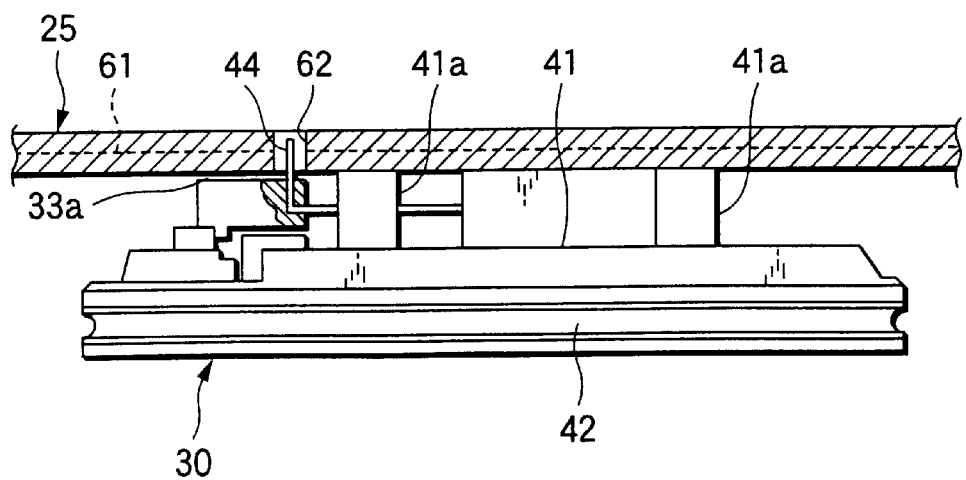
FIG. 11 is a side view (cross sectional view in part) showing a structure of the room lamp when the electric device is pressingly connected to the wire harness and a structure for electrically connecting the room lamp and the wire harness.
Figure 13:
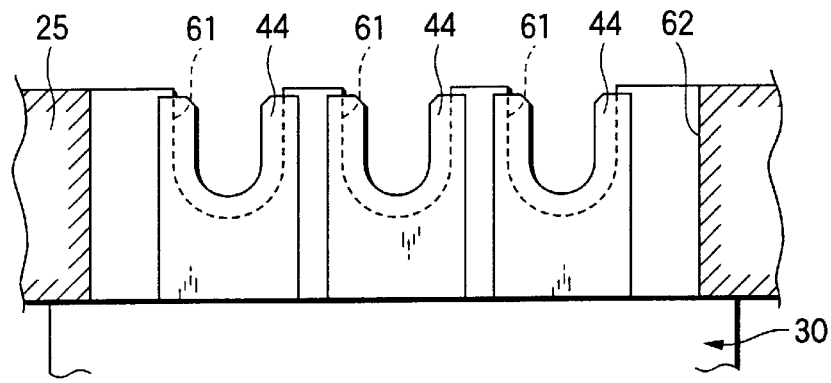
FIG. 13 is a cross sectional view of the sub-frame for showing a relationship between a press contacting blade and the wiring paths when the room lamp is assembled.

The lamps 30 to 32 and the connector 36 are provided with press fitting blades, respectively. In the case of the room lamp 30, as shown in FIGS. 11 and 13, press contacting blades 44 are provided in the upper part of a main body 41 such that those blades rise into the through-holes 62 when the room lamp 30 is assembled to a predetermined location of the sub-frame 25. In this case, as shown in FIG. 13, the press contacting blades 44 are provided such that those blades are introduced into the paths 61 for the electric wires to be connected. The remaining lamps 31 and 32 are also constructed like the room lamp 30, although the detail of them is not illustrated. The connector 36 may be constructed as follows: A press contacting blade to be electrically connected to an upstanding connector terminal is provided on the upper part of the connector housing. When the connector 36 is assembled to the sub-frame 25, the press contacting blade is raised into the through-hole 65.

Figure 14:
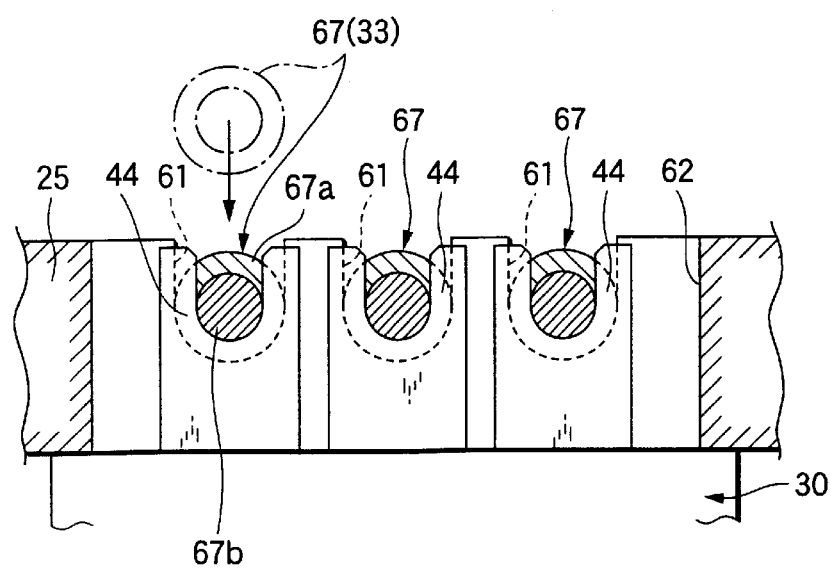
FIG. 14 is a cross sectional view showing a state that the wire harness is laid and electric wires are pressed against the press contacting blades.

The lamps 30 to 32 and the connector 36 are assembled to the underside of the sub-frame 25, and in this state, electric wires (covered electric wires) which form the wire harness 33 are laid while putting them into the groove-like paths 61. By so doing, in the case of the room lamp 30, for example, as shown in FIG. 14, electric wires 67 are pressed against the press contacting blades 44, their covers 67a are cut, and internal conductors 67b of the conductors 67 come in contact with the press contacting blades 44. Thus, the press contacting blades 44 of the room lamp 30 are brought into press contact with the electric wires 67 of the wire harness 33, whereby the room lamp 30 is electrically connected to the wire harness 33. The remaining lamps 31 and 32 and the connector 36 are also constructed like the room lamp 30, although the detail of them is not illustrated.

In such a construction, when the electric wires 67 are laid in and along the paths, the electric wires 67 are brought into press contact with the press contacting blades 44, and are held in a state that the press contacting blades 44 bite into the electric wires 67. Thus, the wire harness 33 is laid while at the same time the lamps 30 to 32 and the like are electrically connected to the wire harness 33, and the wire harness 33 is fixed to the sub-frame 25. Accordingly, the workability in laying the wire harness 33 onto the sub-frame 25 is considerably improved.

The wire harness 33 is easily laid again in a manner that the electric wires 67 are pulled out of the groove-like paths 61 and new electric wires are put thereinto. This is another merit.

Figure 15:
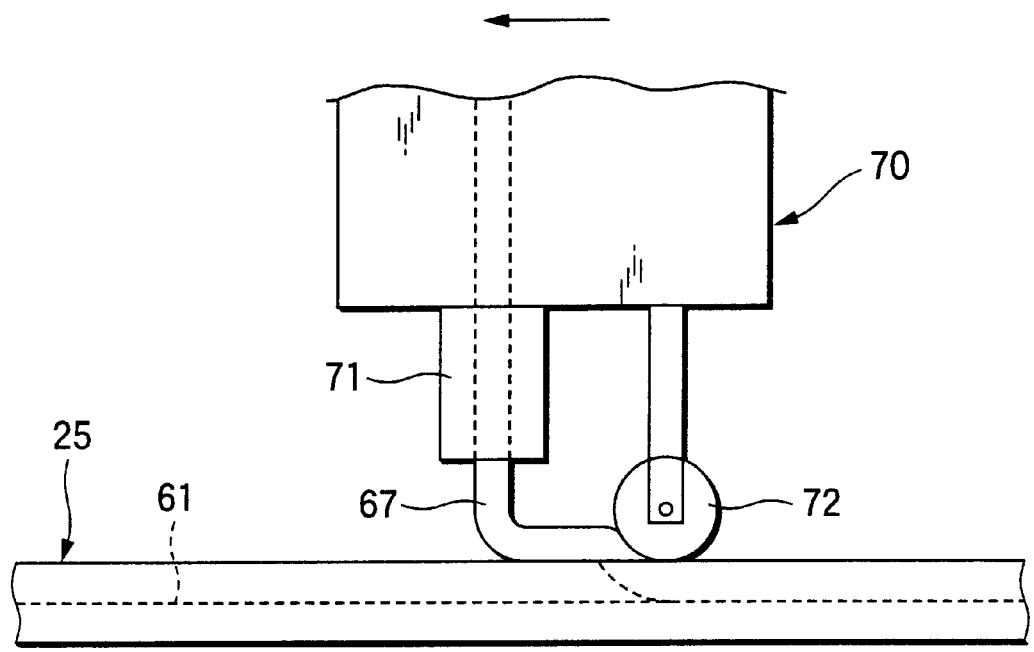
FIG. 15 is a concept diagram useful in explaining a wire-harness wiring method.

In the above-mentioned construction, as shown in FIG. 15, the wire harness 33 may automatically be laid on the sub-frame 25 by using a wiring apparatus 70, which has a head 71 for taking out an electric wire 67 and a roller 72 for pressing the taken out electric wires 67 in a manner that as shown, the wiring apparatus 70 is moved along the groove-like paths 61 and the electric wire 67 led out of the head 71 is pressingly put into the paths 61 by means of the roller 72.

(4) In another structure for laying the wire harness 33, the conductive wires forming the wire harness 33 are formed with wires (wires not covered). By feeding current into the respective conductive wires, the wire harness 33 is laid in a state that it is directly buried in the sub-frame 25.

Figure 16:
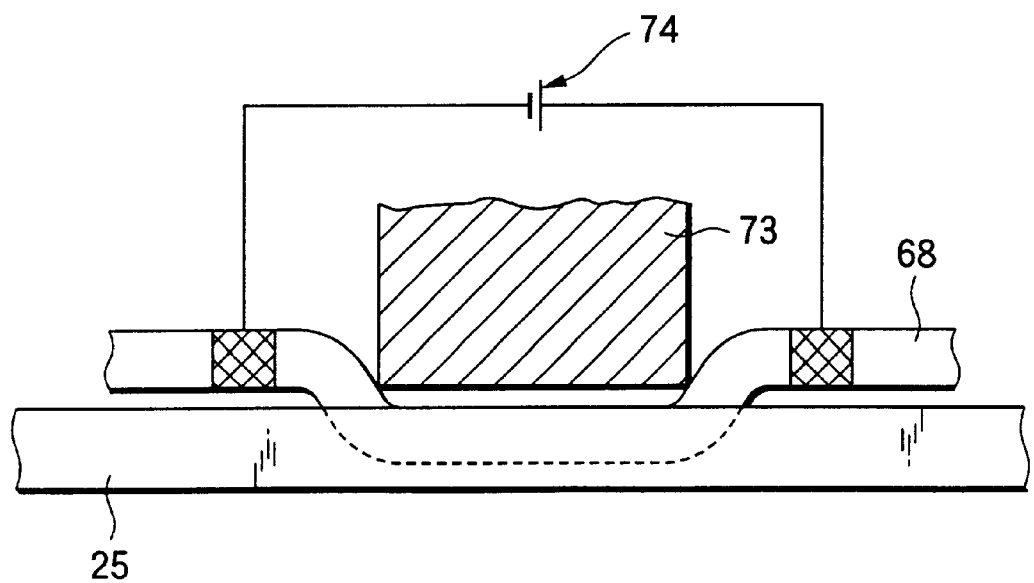
FIG. 16 is a diagram for explaining a modification of a wire-harness wiring structure and method.

To be specifically, as shown in FIG. 16, the conductive wire 68 is wired along and in a predetermined path, and a given range of the wired conductive wire 68 is connected to a power supply 74, whereby current is fed to the conductive wire within this range. Then, the conductive wire 68 is pressed against the sub-frame 25 by means of a holding member 73 formed with an insulating member. By so doing, the sub-frame 25 is molten by heat caused by the current feeding since the sub-frame 25 is made of resin, such as ABS or PE. As a result, the conductive wire 68 is fixed in a state that the conductive wire 68 is buried in the sub-frame 25. In the case of this structure, at the assembling positions of the lamps 30 to 32 and the like of the sub-frame 25, the conductive wire 68 is exposed to the surface (lower surface) of the sub-frame 25. In this state, according to the FIG. 4 structure, plate-spring terminals of the lamps 30 to 32 and the like are brought into contact with the conductive wire 68 to electrically connect those lamps and the like to the wire harness 33.

The structure thus constructed has a advantage that the laying of the wire harness 33 and the fixing of the wire harness 33 to the sub-frame 25 simultaneously be carried out.

In the structure, as described above, the wire harness 33 is formed with the conductive wire 68 and there is no need of using a fixing member exclusively used for fixing the wire harness 33 to the sub-frame 25. These features contribute to weight reduction of the sub-frame unit 11.

Further, in the structure, the wire harness 33 may be laid on the sub-frame 25 along a desired path. This feature is beneficial in that the sub-frame 25 may be applied to different types of vehicles having different wiring paths on the wire harness 33. Accordingly, the cost to manufacture the sub-frame 25 is reduced and this cost reduction leads to cost reduction of the unit assembly 10.

A modification of this structure follows. In the modification, those electric wires of the wire harness 33, for example, are formed with usually used covered electric wires. The internal conductive wires of the covered wires are exposed at specific positions. Current is fed to the internal conductive wires at those exposed positions and the electric wire is fixed in a state that a part of it is buried in the sub-frame 25.

Figure 17:
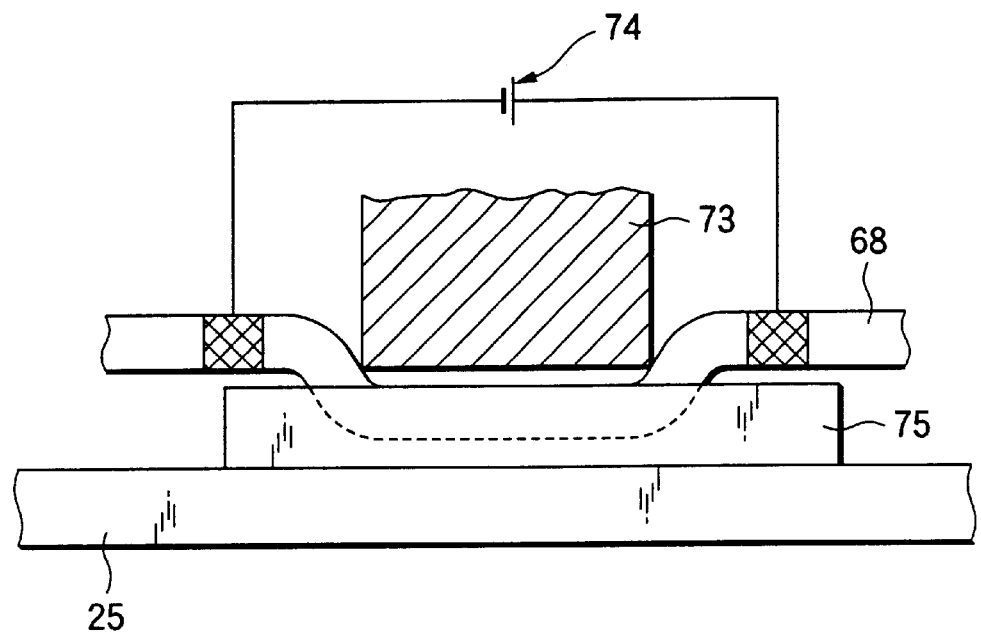
FIG. 17 is a diagram for explaining a modification of the FIG. 17 wire-harness wiring structure.

In a case where the sub-frame 25 is made of metal or resin hard to be molten, as shown in FIG. 17, a fixing member 75 made of thermoplastics, which is relatively easily molten by heat by the current feeding, is mounted on the sub-frame 25, and the conductive wire 68 is fixed to the fixing member 75.

Figure 18:
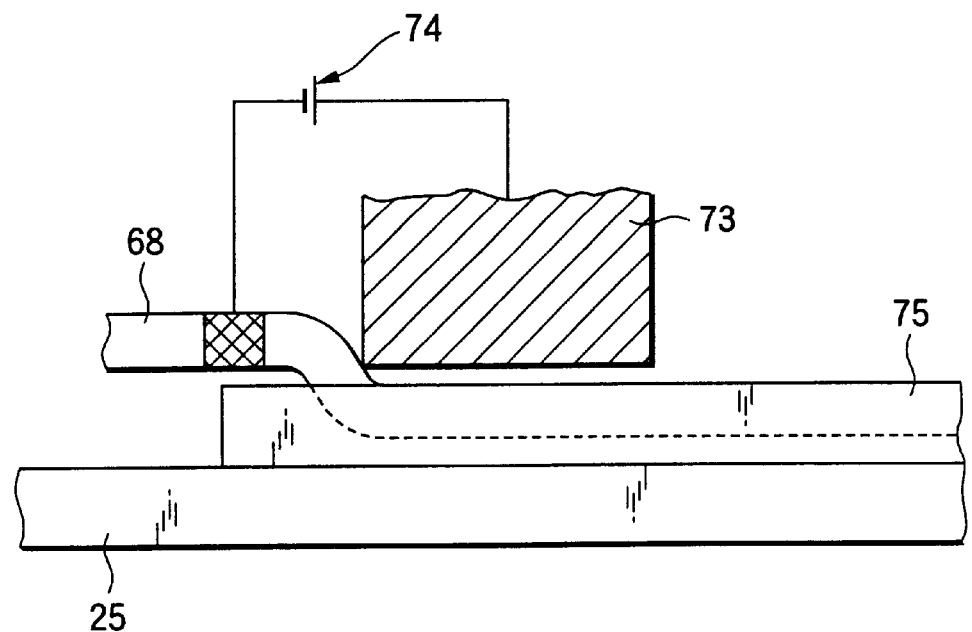
FIG. 18 is a diagram showing a modification of the wire-harness wiring method.

The wiring work of the conductive wire 68 may be carried out in the following way. The holding member 73 is formed with a conductive wire made of metal or such. As shown in FIG. 18, a part of the conductive wire 68 and the holding member 73 are connected to a power supply 74. When the conductive wire 68 is pressed against the counter member, current flows into the conductive wire 68.

C. Construction of the Lamps 30 to 32

Figure 19:
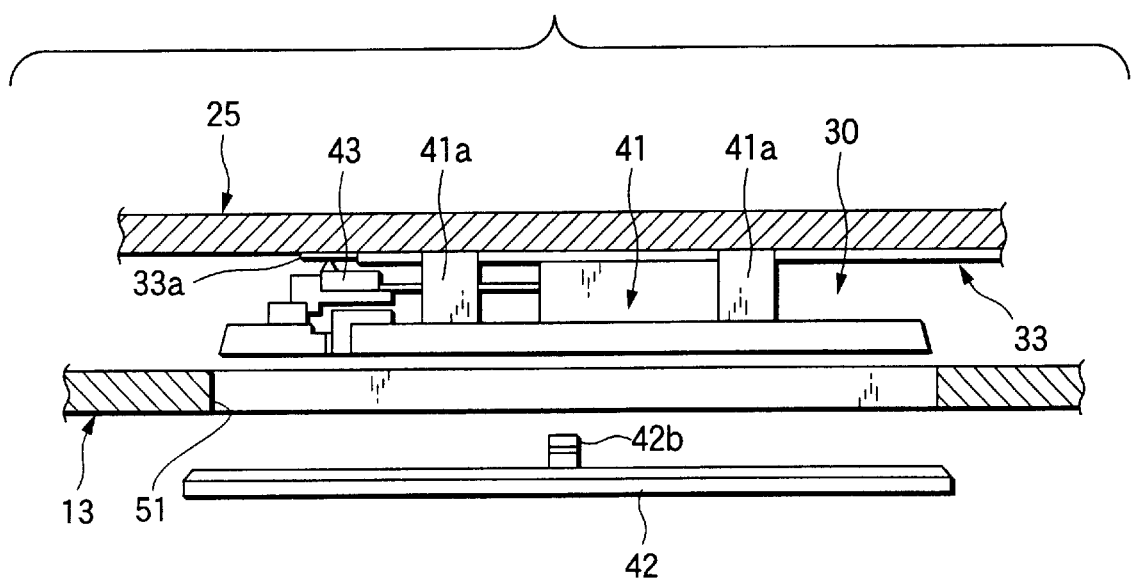
FIG. 19 is a side view (cross sectional view in part) showing a modification of the room lamp and a relationship between the room lamp and the molded ceiling (before assembling).
Figure 20:
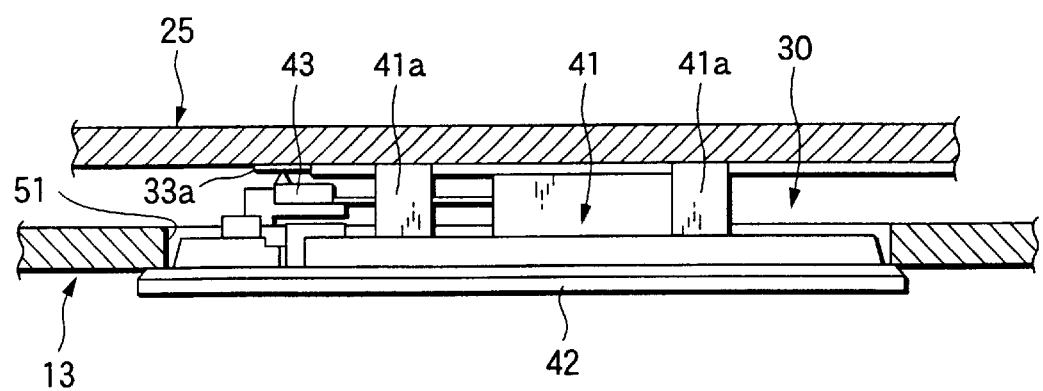
FIG. 20 is a side view (cross sectional view in part) showing another modification of the room lamp and a relationship between the room lamp and the molded ceiling (before assembling).

The room lamp 30 will typically be described about the constructions of those lamps. As shown in FIG. 19, the main body 41 of the room lamp 30 is smaller than the lamp opening 51 of the molded ceiling 13. The lamp cover 42 is larger than the lamp opening 51. As shown, in the vehicular ceiling assembling work, the molded ceiling 13 is assembled in a state that the lamp cover 42 is removed. Thereafter, as shown in FIG. 20, the lamp cover 42 is mounted on the main body 41 through the lamp opening 51 from the under side of the molded ceiling 13. In this case, as shown in FIG. 19, a hook 42b is provided on the lamp cover 42. The hook 42b is brought into engagement with an engaging part (not shown), whereby the lamp cover 42 is mounted on the main body 41.

Also in this case, the circumferential edge of the lamp opening 51 is hidden with the lamp cover 42. As a result, a good external appearance of it within the car cabin is secured. While the room lamp 30 has been described, the construction of this lamp is correspondingly applied to the other lamps, the map lamp 31 and the vanity lamps 32.

D. Other Constructions (1) The sub-frame unit 11 and the sun roof unit 12 may separately be assembled to the body ceiling 2, while those units are coupled into the unit assembly 10 in the constructions mentioned above. In this construction, the sub-frame unit 11 forms a unit assembly constructed according to the present invention.

(2) It is clear that the electric devices, components and such to be assembled to the sub-frame 25 may be an air cleaner, audio devices such as speakers and others, in addition to the lamps 30 to 32.

As seen from the foregoing description, in a vehicular ceiling assembling structure for assembling electric devices, such as lamps, and a molded ceiling onto a body ceiling of a vehicle body, a frame member to which electric devices and a wire harness for the electric devices are assembled is constructed in advance, and the frame member is assembled to the molded ceiling, whereby the electric devices and the like may be assembled to the molded ceiling by one assembling work. Therefore, a chance of the work by the worker with his face upward is lessened. The result is to improve the workability in the vehicular ceiling assembling work.

Since a chance of the work by the worker with his face upward is lessened, occurrence of the defective assembling is effectively reduced.

A preferred embodiment of the invention will be described by reference to the accompanying drawings.

Figure 21:
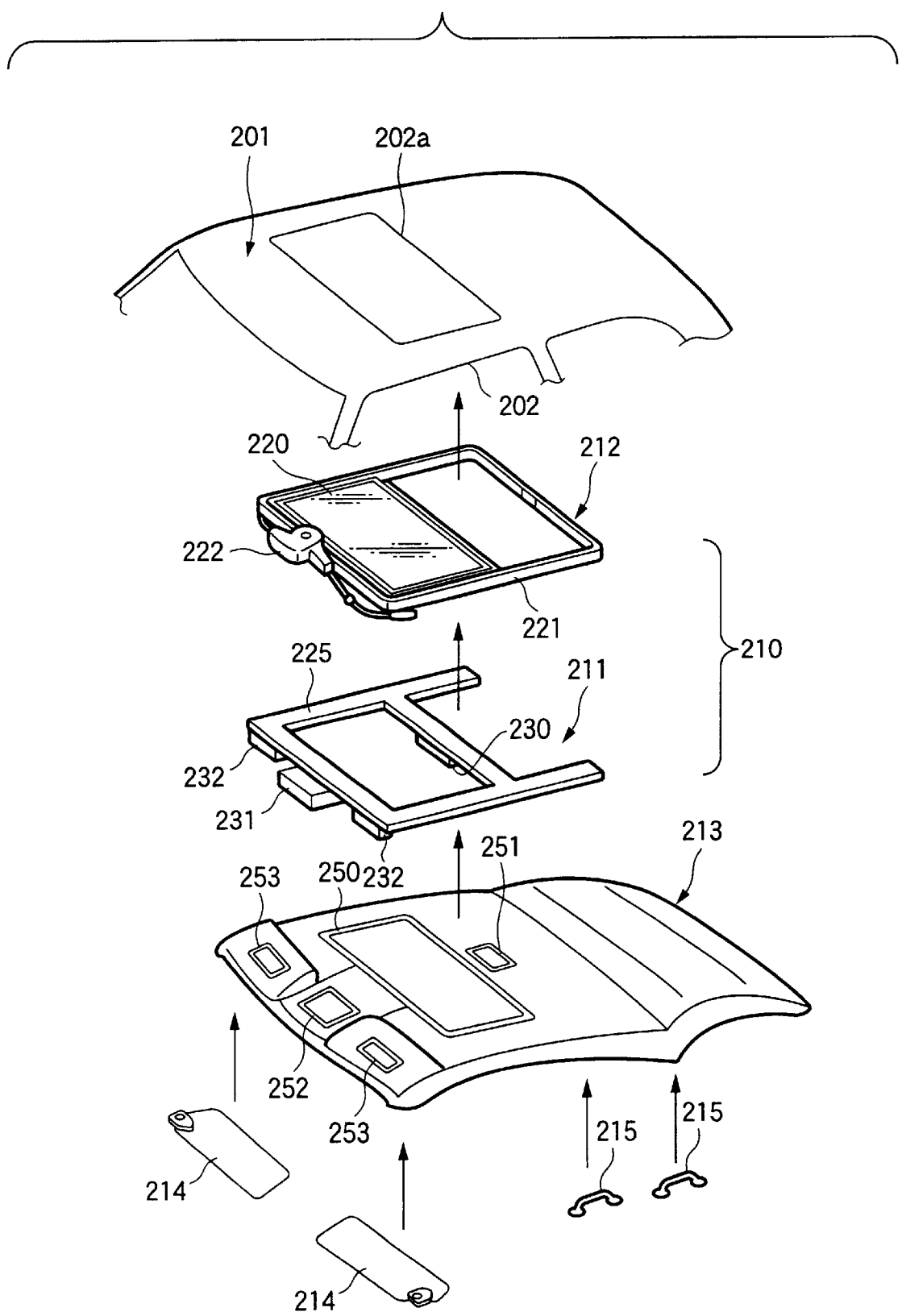
FIG. 21 is an exploded perspective view showing an example structure for assembling the roof of a vehicle to which a construction for installing a wiring harness according to the present invention is to be applied.

FIG. 21 is a perspective exploded view showing the assembly construction of the roof of a vehicle to which a construction for installing a wiring harness according to the present invention is to be applied. The body 201 of an illustrated vehicle (hereinafter referred to simply as a "body 201") is the body of a vehicle having a sunroof. An aperture 202a for accommodating a sunroof is formed in a roof 202 of the body. A unit member 210, a molded roof 213, a sun visor 214, and an assist grip 215 are assembled and mounted on the underside (facing a cabin) of the roof 202.

The unit member 210 is assembled from a sub-frame unit 211 and a sunroof unit 212. The sunroof unit 212 is placed on and integrally fixed to the sub-frame unit 211 so as to oppose the roof 202.

Figure 22:
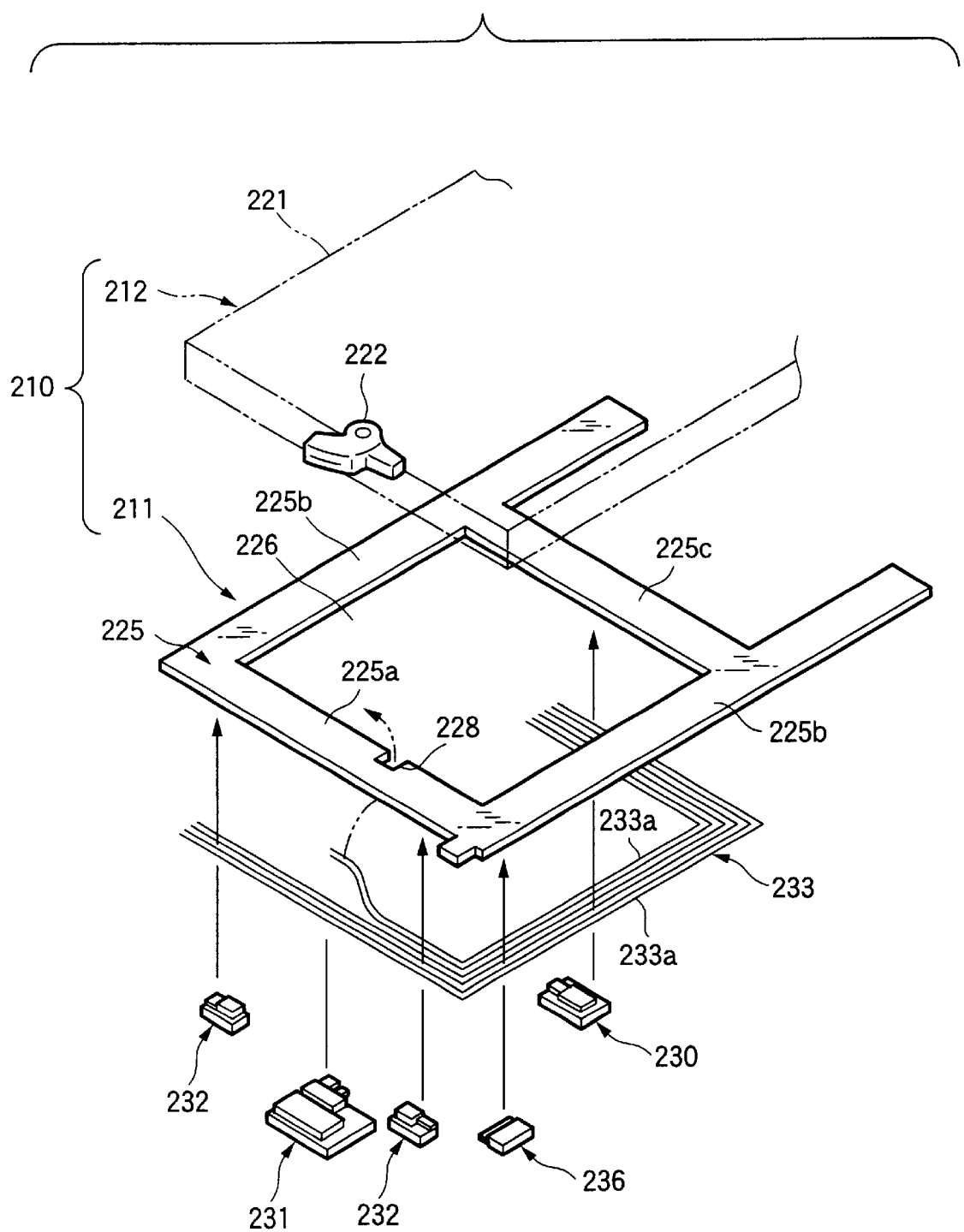
FIG. 22 is an exploded perspective view showing the structure of a unit member.

As shown in FIG. 22, the unit member 210 has a sub-frame 225 (frame member), and electrical components are mounted on the sub-frame 225. As will be described later, a wiring harness 233 for use with the electrical components is installed by a method according to the present invention. The electrical components; that is, a courtesy lamp 230, a map lamp 231, a pair of vanity lamps 232, and a connector 236 for the wiring harness 233 to a wiring harness provided in a cabin are mounted on the sub-frame 225.

The sub-frame 225 is a thin-plate hard member formed from resin such as acrylonitrile butadiene styrene copolymer (ABS) or polyethylene (PE). The sub-frame 225 is formed so as to match the layout of the lamps 230 to 232 and the channel along which the wiring harness 233 is installed. More specifically, the sub-frame 225 is formed from a front section 225a which extends in the widthwise direction of the vehicle body 202 in the vicinity of a front pillar of the vehicle body 201; a pair of side sections 225b which extend from respective ends of the front section 225a toward the rear of the vehicle body 201; and a center section 225c for interconnecting the side sections 225b at substantially the center of the vehicle body 201 in the longitudinal direction thereof. A sunroof aperture 226 is formed in the area surrounded by the front side section 225a, the side sections 225b, and the center section 225c.

The map lamp 231, the vanity lamps 232, and the connector 236 are mounted on the underside of the front section 225a, and the courtesy lamp 230 is mounted on the underside of the center section 225c. The wiring harness 233 is installed on the underside of the front section 225a, the side sections 225b, and the center section 225c so as to pass by the lamps 230 to 232 and the connector 236. Further, the wiring harness 233 is electrically connected to the lamps 230 to 232.

In order to mount the lamps 230 to 232 and the wiring harness 233 to the sub-frame 225, the wiring harness 233 is installed on the sub-frame 225, and the lamps 230 to 232 are mounted on the sub-frame 225 so as to overlap the wiring harness 233. More specifically, the lamps 230 to 232 are mounted on the sub-frame 225 in the following manner.

In the present embodiment, the wiring harness 233 is made of bare electrical wires 233a (conductors). The electrical wires 233a are embedded in their entirety in the sub-frame 225 along a predetermined channel, except for specific portions (exposed portions 235 to be described later). The electrical wires 233a are fixed on the sub-frame 225 by means of welding.

Figure 23:
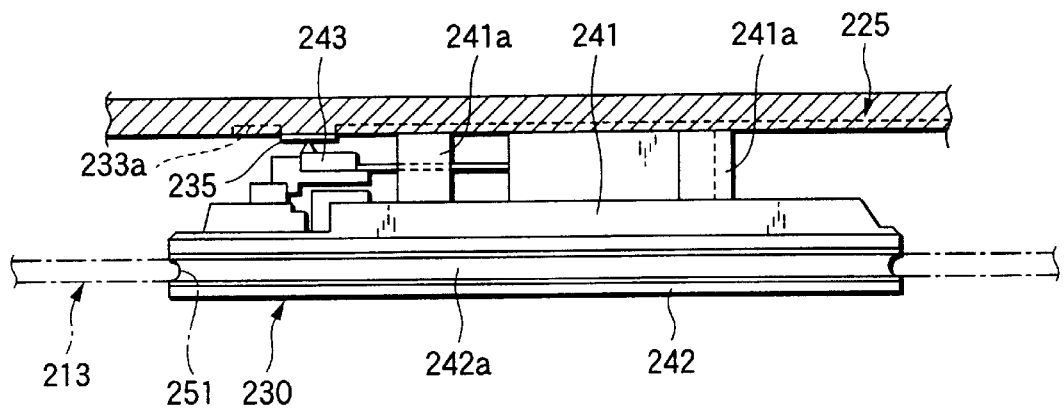
FIG. 23 is a side elevation view (a partial cross sectional view) showing the construction of a courtesy lamp and a construction for establishing an electrical connection between the courtesy lamp and a wiring harness.

The lamps 230 to 232 are mounted on the sub-frame 225 by means of bolts. Mounting of the courtesy lamp 230 will be specifically described as an example. As shown in FIG. 23, the courtesy lamp 230 comprises a main body 241 having a bulb and a switching circuit, and a lamp cover 242 to be mounted on the underside of the main body 241. A plurality of cylindrical ribs 241a are provided in an upright position on the surface of the main body 241 to be attached to the sub-frame 225. By means of the ribs 241a, the courtesy lamp 230 is placed in a predetermined position on the sub-frame 225 so as to straddle the wiring harness 233. The main body 241 is secured with bolts by way of the ribs 241a, thereby mounting the courtesy lamp 230 to the underside of the sub-frame 225.

As shown in the drawing, a leaf-spring terminal 243 is attached to the main body 241, and portions of the electrical wires 233a of the wiring harness 233 are exposed downward from the sub-frame 225 in the position where the courtesy lamp 230 is mounted, thereby constituting exposed portions 235. As mentioned above, when the courtesy lamp 230 is mounted on the sub-frame 225, the terminal 243 is brought into contact with the exposed portions 235 of the electrical wires 233a under the restoration force of the terminal 243. As a result, the courtesy lamp 230 is electrically connected to the wiring harness 233. The map lamp 231 and the vanity lamps 232 are in principle identical with the courtesy lamp 230 and are mounted to the sub-frame 225 and electrically connected to the wiring harness 233 in the same manner as is the courtesy lamp 230. Although not shown in detail, the connector 236 is constructed such that a portion of a connector terminal is exposed outside a connector housing. As mentioned above, portions of the electrical wires 233a of the wiring harness 233 are exposed from the sub-frame 225 in the position where the connector 236 is to be attached to the sub-frame 225, thus constituting the exposed portions 235. When the connector 236 is attached to the sub-frame 225, the terminal 243 is brought into contact with the exposed portions 235 of the electrical wires 233a, thereby establishing electrical connection between the connector 236 and the wiring harness 233.

As shown in FIG. 21, the sunroof unit 212 has a frame 221, and a sunroof 220 made of, for example, smoked glass, is fitted into the sunroof unit 212 in a slidable manner. Further, a roof drive mechanism employing a motor 222 as a drive source is mounted on the frame 221. Although not shown in the drawing, the frame 221 is mounted on top of the sub-frame 225 of the sub-frame unit 211 by means of, for example, bolts.

A power signal and a control signal for activating the sunroof unit 212 are output by way of the wiring harness 233. The sunroof unit 212 is electrically connected to the wiring harness 233 in the following manner.

As shown in FIG. 22, a portion of the wiring harness 233 assigned to the sunroof unit 212 is led to the top of the sub-frame 225 by way of a notch 228 formed in the front section 225a of the sub-frame 225. The wiring harness 233 is welded to the sub-frame 225 while a portion (i.e., the exposed portions 235 shown in FIG. 24A) of the wiring harness 233 is exposed on top of the sub-fame 225. A leaf spring terminal similar to that used for the courtesy lamp 230 is provided on the surface of the sunroof 212 to be mounted on the sub-frame 225. When the sunroof unit 212 is mounted on the sub-frame 225, the terminal of the sunroof 212 is brought into contact with the exposed portions 235 of the electrical wires 233a led to the top of the sub-frame 225. Thus, the sunroof unit 212 is electrically connected to the wiring harness 233.

The molded roof 213 is made of, for example, synthetic fiber. As shown in FIG. 21, a sunroof aperture 250 is formed in the center of the roof 213. In a front-side portion of the vehicle body 1 with reference to the sunroof aperture 250, lamp apertures 251 to 253 are formed for the lamps 231 and 232. Further, in a rear-side portion of the vehicle body 201 relative to the sunroof aperture 250, a lamp aperture 251 is formed for the courtesy lamp 230. The lamps 230 to 232 oppose the cabin by way of the lamp apertures 251 to 253.

The lamp apertures 251 to 253 are formed so as to become slightly smaller than covers of the respective lamps 230 to 232. The edges of the lamp apertures 251 to 253 are fitted to fitting grooves formed in the respective lamps 230 to 232, whereby the edges of the lamp apertures 251 to 253 are hidden from the cabin, thus the enhancing appearance of the lamps 230 to 232 when viewed from the cabin. As shown in FIG. 23, a recess 242a is formed around the lamp cover 242, and the edge of the lamp aperture 241 is fitted into the recess 242a. Although not shown in the drawings, the same construction applies to the map lamp 231 and the vanity lamps 232.

An operation for assembling the roof of the vehicle will now be described by reference to FIGS. 24 and 25.

In the operation for assembling the roof, the unit member 210 is assembled beforehand.

Figure 24A:
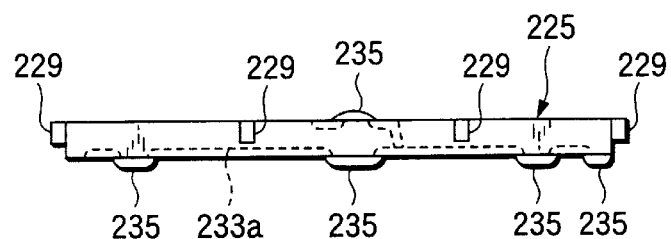
FIGS. 24A to 24C are illustrations for describing the construction for assembling the roof of a vehicle.
Figure 26:
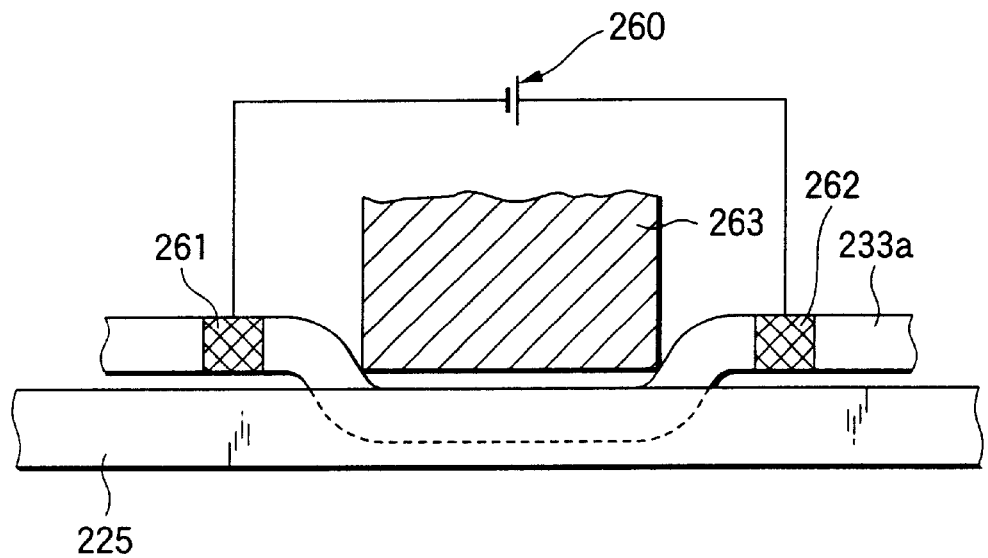
FIG. 26 is an illustration for describing an operation for installing a wiring harness.
Figure 27:
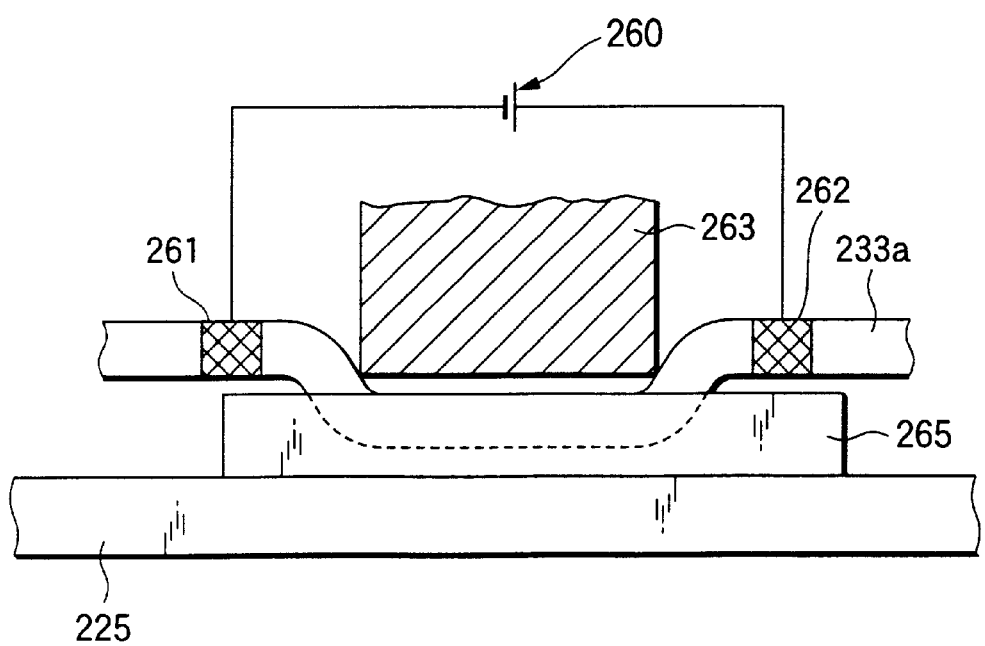
FIG. 27 is an illustration for describing a modified example construction for installing a wiring harness and an operation for installing a wiring harness.

As shown in FIG. 24A, the wiring harness 233 is installed along the sub-frame 225. While the electrical wires 233a constituting the wiring harness 233 are being installed along a predetermined channel, electric current is applied to the electrical wires 233a so as to weld the electrical wires 233a to the sub-frame 225, thus installing the wiring harness 233. As shown in FIG. 26, terminals 261 and 262 connected to a current source 260 are brought into contact with the electrical wires 233a while being spaced apart from each other at predetermined interval, and electric current is applied to the area defined between the terminals 261 and 262. The area is pressed against the sub-frame 225 by means of a press member 263 made of, for example, an insulating material. As a result, the electrical wires 233a located in the area generate heat by means of passage of an electric current, and the heat melts the sub-frame 225. Further, the electrical wires 233a are pressed against the thus-melt portion of the sub-frame 225, whereby the electrical wires 233a are embedded in the sub-frame 225. After termination of application of an electric current, the melt sub-frame 225 becomes set. As a result, the wiring harness 233 is welded while the portions of the electrical wires 233a located in the area remain embedded in the sub-frame 225.

The above-described welding operations are performed sequentially in the direction in which the electrical wires 233a are to be installed. As a result, the electrical wires 233a are welded in their entirety to the sub-frame 225, with the exception of the portions of the electrical wires 233a corresponding to the lamps 230 to 232 (i.e., the exposed portions 235). The remaining portions of the electrical wires 233a constituting the wiring harness 233 are welded to the sub-frame 225 in the same manner. In this way, the wiring harness 233 is installed on the sub-frame 225. In FIG. 24A, reference numeral 229 designates a cylindrical rib for mounting the unit member 210 to the roof 202.

Figure 24B:
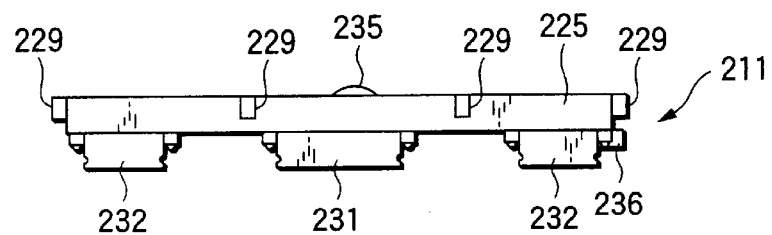

As shown in FIG. 24B, the lamps 230 to 232 and the connector 236 are mounted in predetermined positions on the underside of the sub-frame 225. When the lamps 230 to 232 and the connector 236 are mounted on the sub-frame 225, terminals of the lamps 230 to 232 are brought into contact with the exposed portion 235 of each of the electrical wires 233a of the wiring harness 233, thereby electrically connecting the lamps 230 to 232 to the wiring harness 233. Thus, assembly of the sub-frame 211 is completed. Assembly of the sub-frame 211 can be efficiently performed with a comfortable working position by means of fixedly positioning the sub-frame 225 upside down on a work bench, and installing the wiring harness 233 and mounting the lamps 230 to 232 on the underside of the sub-frame 225.

Figure 24C:
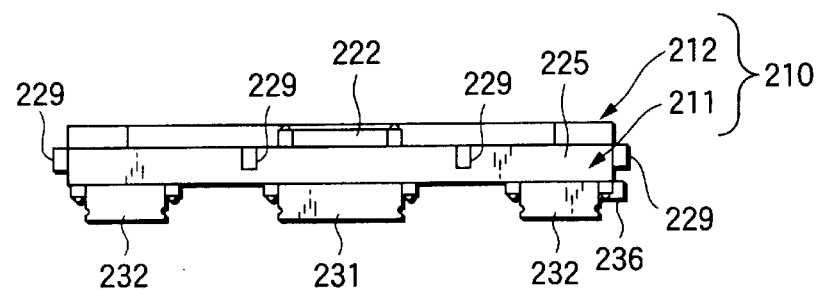

As shown in FIG. 24C, after completion of the sub-frame unit 211, the sunroof unit 212 which has already been assembled in another line is attached to the upper surface of the sub-frame 225 of the sub-frame unit 211. As a result, the terminals of the sunroof unit 212 are brought into contact with the exposed portions 235 of the electrical wires 233a of the wiring harness 233 led to the upper surface of the sub-frame 225, thereby electrically connecting the sunroof unit 212 with the wiring harness 233. Thus, the unit member 210 is completed.

Figure 25A:
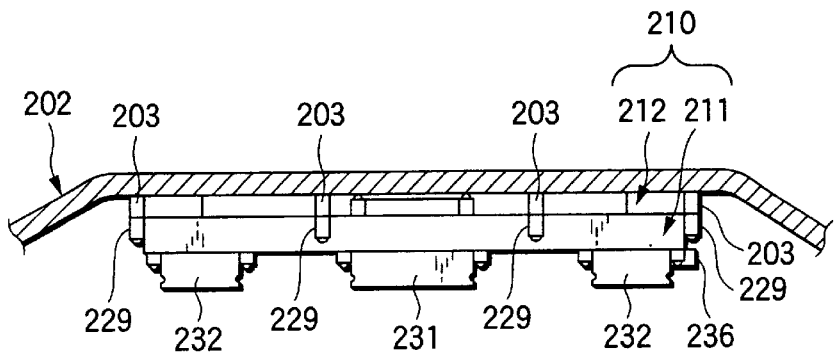
FIGS. 25A to 25C are illustrations for describing the construction for assembling the roof of a vehicle.

In the operation for assembling the roof (i.e., the major operation), the unit member 210 which has been assembled beforehand in the foregoing manner is mounted on the roof 202, as shown in FIG. 25A. More specifically, the unit member 210 is placed in a predetermined position on the roof 202 and is secured to fixing sections 203 formed on the roof 202, by way of the ribs 229 and through use of bolts.

Figure 25B:
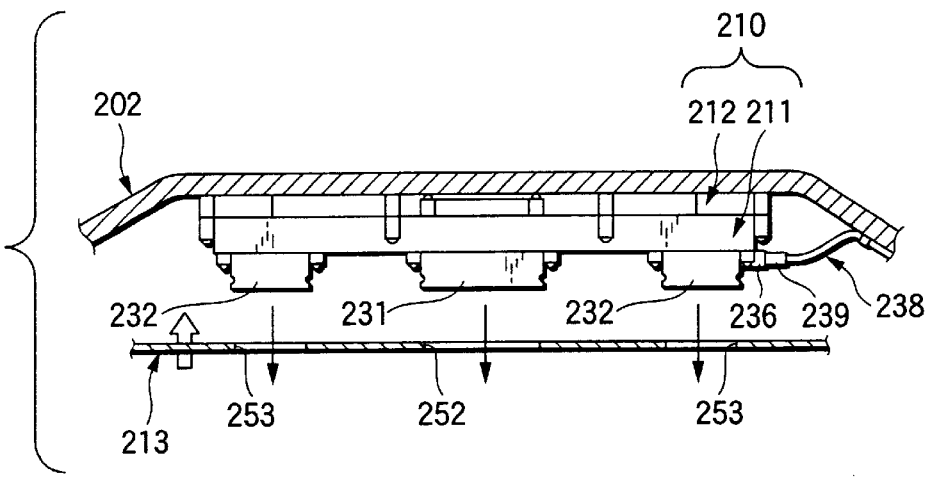

As shown in FIG. 25B, the wiring harness 238 is installed along the front pillar of the vehicle body 201, and the connector 239 of the wiring harness 238 is connected to the connector 236 of the unit member 210. Here, the wiring harness 238 may be installed beforehand; i.e., before the unit member 210 is mounted on the roof 202.

Figure 25C:
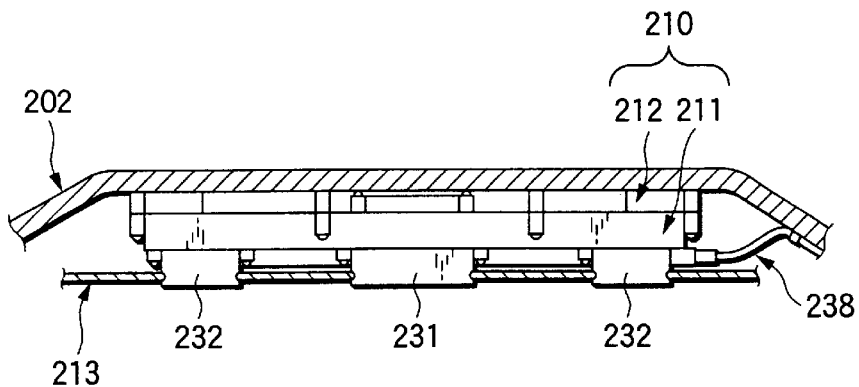

The molded roof 213 is positioned below the unit member 210 and is secured to the roof 202 by means of bolts. As shown in FIG. 25C, the lamps 230 to 232 are fitted into the corresponding lamp apertures 251 to 253 formed in the molded roof 213 so as to oppose the cabin (a lower area of the drawing). At this time, the edges of the lamp apertures 251 to 253 are fitted to the recesses 242a formed in the lamp covers of the lamps 230 to 232 in the manner as mentioned previously, thereby hiding the edges of the apertures 251 to 253.

After mounting of the molded roof 213 is completed, the sun visor 214 and the assist grip 215 are secured on the roof 202 with bolts from the outside of the molded roof 213 (i.e., the cabin). Thus, assembly of the roof 202 is completed.

By means of the construction for assembling the roof of the vehicle set forth, the sunroof unit 212, the lamps 230 to 232, and the wiring harness 233 therefor can be mounted on the roof 202 simultaneously during the operation for assembling a roof, by means of mounting only the unit member 210 on the roof 202. As a result, the ease of operation for assembling the roof of a vehicle can be improved.

As mentioned above, since the wiring harness 233 is installed on the sub-frame 225 in the manner as mentioned above, the unit member 210 yields the following advantages in terms of performance, the ease of assembly, and costs.

(1) Performance Advantage

As mentioned above, bare electrical wires are used as the electrical wires 233a of the wiring harness 233. Hence, the present embodiment enables a reduction in the weight of the unit member 210 as compared with a case where covered electrical wires are used as the electrical wires 233a. The electrical wires 33a of the wiring harness 233 are directly fixed to the sub-frame 225 by means of welding, thereby obviating use of custom-designed fixing members such as clamps. In this regard, the weight of the unit member 210 can be reduced.

Since the wiring harness 233 is welded to the sub-frame 225, the wiring harness 233 can be installed on the sub-frame 225 along an arbitrary route. For this reason, the present invention has the merit of affording a high degree of flexibility in terms of the route for installing the wiring harness 233.

(2) Advantage Concerning Ease of Assemble

During the course of assembly of the unit member 210, particularly the course of installment of the wiring harness 233, the electrical wires 233a can be fixed to the sub-frame 225 without involvement of efforts, by means of pressing and applying an electric current to the electrical wires 233a while installing the electrical wires 233a. Thus, the operation for installing the wiring harness 233 can be performed efficiently.

(3) Cost Advantage

The wiring harness 233 is formed while bare electrical wires (conductors) are used as the electrical wires 233a. The wiring harness can be formed less costly than a case where a wiring harness is formed from coated electrical wires.

Thus, the wiring harness 233 can be installed on the sub-frame 225 along an arbitrary route. The sub-frame 225 can be shared among different types of vehicles and among wiring harnesses of different structures or wiring harnesses requiring different installment routes. Therefore, commonality of the sub-frame 225 can contribute to a reduction in the costs of sub-frame 225.

The construction and method of installing the wiring harness described in the embodiment belong to one of embodiments. A specific construction and method for installing a wiring harness can be modified within the scope of the invention, as required. The present invention can assume the following examples.

(1) The electrical wires 233a of the wiring harness 233 are formed from coated electrical wires, and the sheath of electrical wires 233a are removed at specific locations so as to become exposed, and only the portions of the electrical wires 233a in which the internal conductor becomes exposed may be welded to the sub-frame 225.

(2) In a case where the sub-frame 225 is formed primarily from metal, a portion 265 is formed from resin such as ABS or polyethylene on the sub-frame 225. The wiring harness 233 may be installed on the portion 265.

Figure 28:
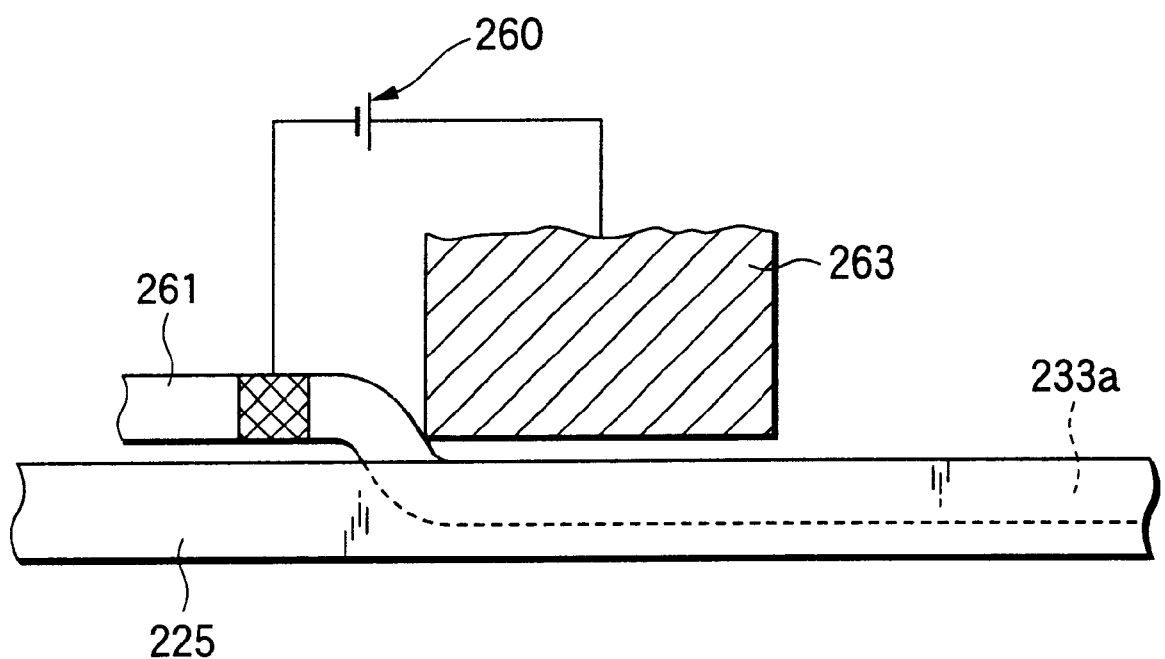
FIG. 28 is an illustration for describing another example operation for installing a wiring harness.

(3) At the time of installment of the electrical wires 233a, the press member 263 formed from metal (conductor) is used. As shown in FIG. 28, there may be performed an operation such that the electrical wires 233a and the press member 263 are connected to the power source 260 and such that, when the press member 263 is pressed against the electrical wires 233a, an electric current flows to the electrical wires 233a. By means of such a configuration, an electric current automatically flows to the electrical wires 233a only when the press member 263 is pressed against the electrical wires 233a, thereby obviating a manual operation for turning on or off a power switch in order to interrupt supply of current to the electrical wires 233a. Thus, there is yielded the merit of improving the ease of operation. Since supply of an electric current is automatically interrupted at all times other than the period of time during which an operation is to be performed, there is also yielded a merit in terms of safety of an operation.

(5) Resin used for constituting the sub-frame 225 or resin used for constituting the portion 265 described in connection with (2) is not limited to resin such as ABS or polyethylene. Wiring harness 233 can be welded to the sub-frame 225 by means of application of electric current to the electrical wires 233a. Any material may be used for constituting the sub-frame 225, so long as the material corresponds to insulating resin.

The previous embodiment has been described by reference to a case where the wiring harness 233 is installed on the sub-frame 225. As a matter of course, the present invention can be applied to the vehicle 201 other than the sub-frame 225. For instance, in a case where a wiring harness is directly installed on the molded roof 213 or where a wiring harness is installed on an interior panel of a door.

As has been described above, the present invention relates to a construction for enabling installment of a wiring harness in an area made of resin along a predetermined route. Bare wires are used as electrical wires constituting a wiring harness, and the areas having the wiring harness installed thereon are melt, thereby welding the electrical wires to the areas. The wiring harness according to the present invention can contribute to reductions in the weight of a vehicle body and costs as compared with a wiring harness which is made of a coated electrical wire and fixed to an area on which the wiring harness is to be installed, through use of custom-designed clamps.

In a case where a wiring harness is installed on an area—on which a wiring harness is to be installed and which is made of resin and which is made of resin—along a predetermined path, bare electrical wires are used as electrical wires for constituting a wiring harness. The bare electrical wires are installed on the area along a route. The area is melt by means of pressing the electrical wires against the area while an electric current is applied to the electrical wires so as to heat the same. As a result, the electrical wires are welded to the area, and hence the electrical wires can be fixed to the area without involvement of efforts while being installed. Thus, the ease of operation (ease of assembly) for installing the wiring harness can be improved.

The Preferred Embodiments of the present invention will be described with reference to the accompanying drawings.

Figure 29:
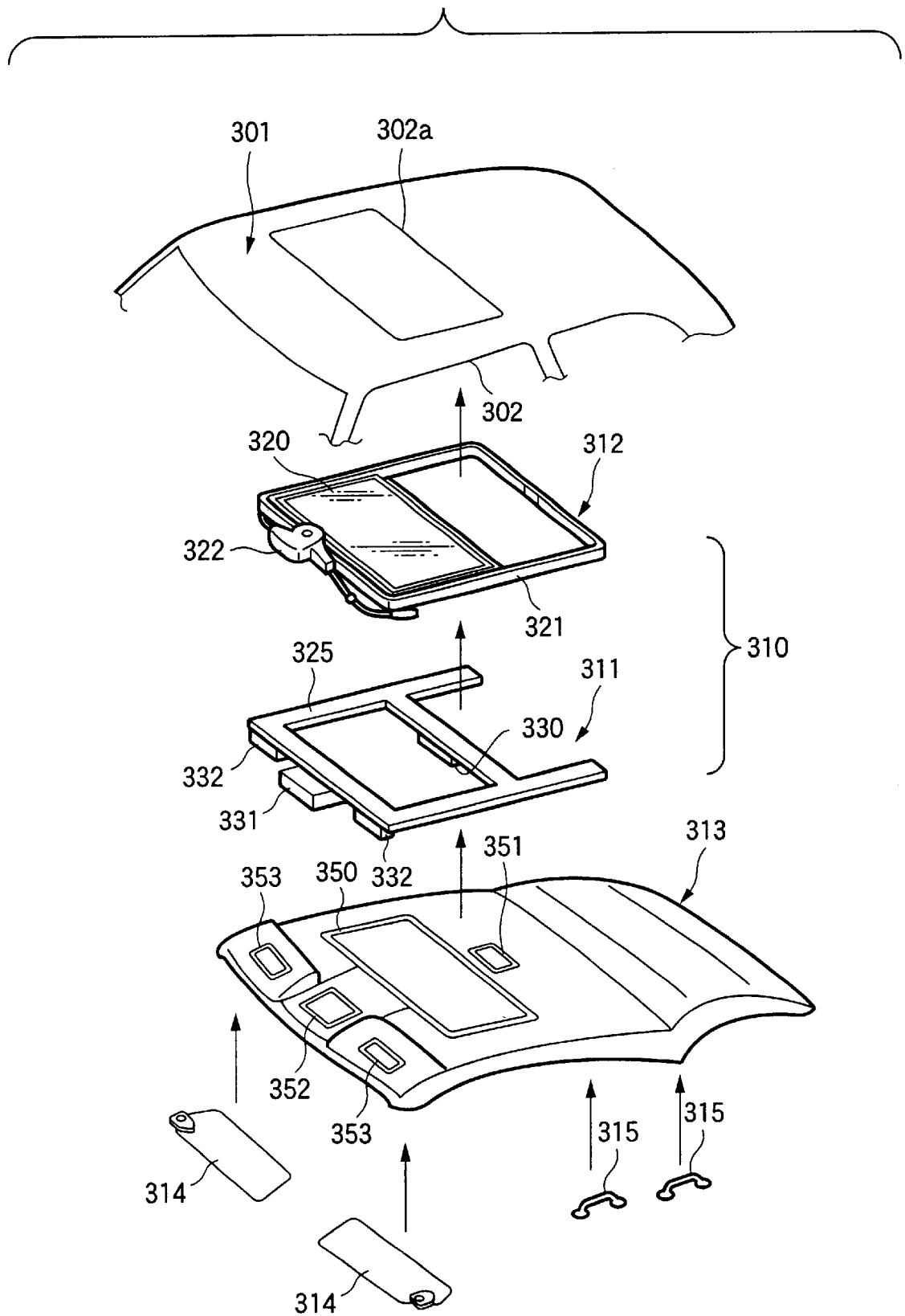
FIG. 29 is an exploded view showing a vehicular ceiling assembling structure using a vehicular ceiling illuminating device, which is constructed according to the present invention.

FIG. 29 is an exploded view showing a vehicular ceiling assembling structure using vehicular ceiling illuminating devices, each of which is constructed according to the present invention. A vehicle body 301 illustrated is provided with a sun roof, and an opening portion 302a for the sun roof is formed in a body ceiling 302. A unit assembly 310, a molded ceiling 313, sun visors 314 and assist grips 315 are assembled onto the underside (room side) of the body ceiling 302.

The unit assembly 310 is formed with a sub-frame unit 311 and a sun roof unit 312. The sun roof unit 312 and the sub-frame unit 311 are coupled together to form a unitary construction in a state that the former is located on the upper side (body ceiling side) and the latter is located on the lower side.

Figure 30:
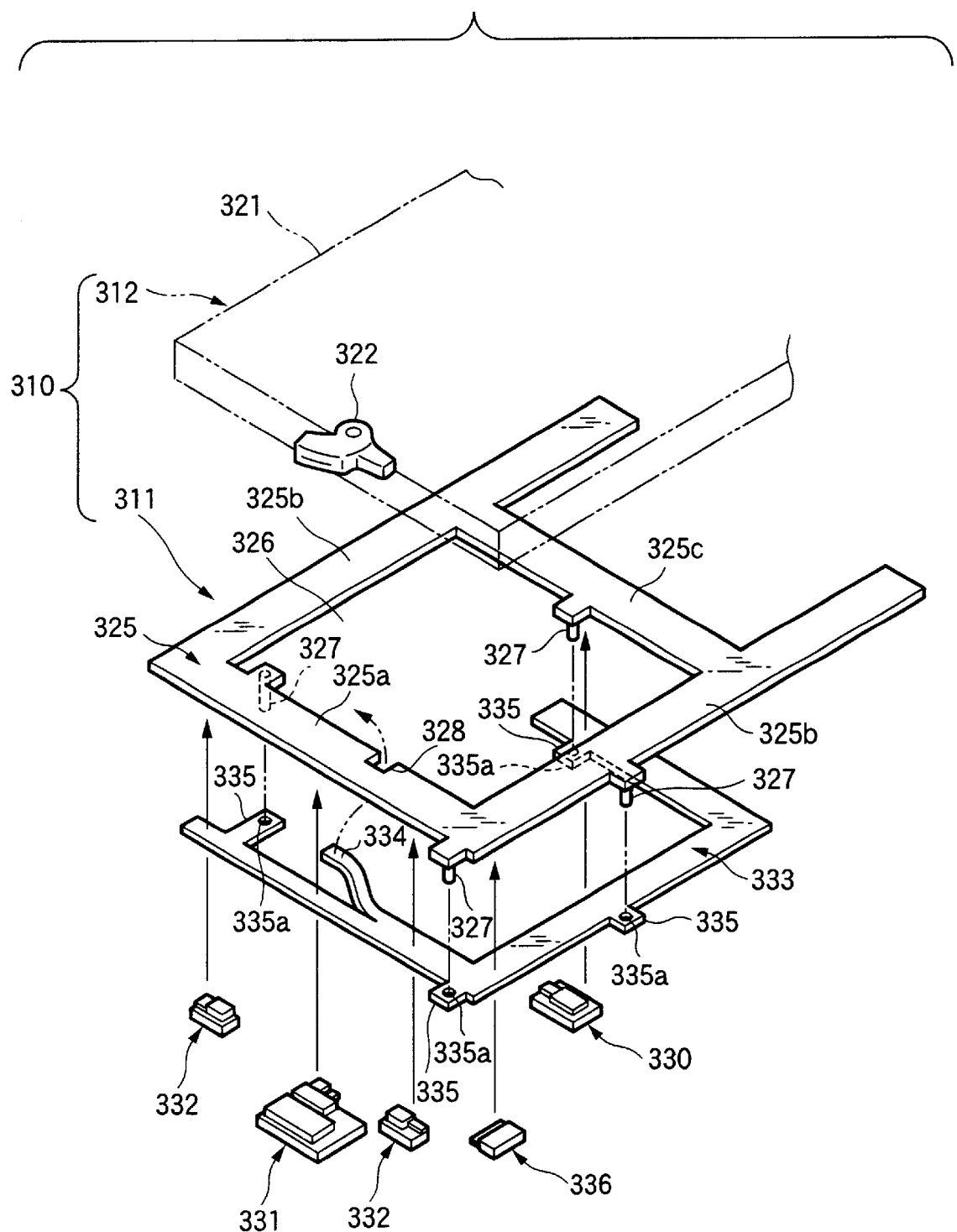
FIG. 30 is an exploded view showing a structure of a unit assembly.

The unit assembly 310, as shown in FIG. 30, includes a sub-frame 325. Various types of electric devices/components and a wire harness 333 for those electric devices are assembled to the sub-frame 325. Examples of those electric devices/components are a room lamp 330, a map lamp 331, and a pair of vanity lamps 332, and a connector 336 for connecting the wire harness 333 to a wire harness of the vehicle cabin.

The sub-frame 325 is a thin plate-like member made of a hard resin, such as acrylonitrile-butadinene-styrene (ABS) or polyethylene (PE). The sub-frame is configured based on a layout of those lamps 330 to 332 and wiring routes of the wire harness 333. Specifically, the sub-frame comprises a front portion 325a which extends in the widthwise direction of the vehicle body 301 in the vicinity of the front pillar of the vehicle body 301, a pair of side portions 325b which extends from both ends of the front portion 325a as viewed in the widthwise direction in the rearward direction of the vehicle body, and a center portion 325c which couples together the side portions 325b in the mid position of the vehicle body 301 when viewed in the longitudinal direction of the vehicle body 301. An opening 326 for the sun roof is defined by the front portion 325a, the side portions 325b and the center portion 325c.

The map lamp 331, the vanity lamps 332 and the connector 336 are assembled to the lower side of the front portion 325a, and the room lamp 330 is assembled to the lower side of the center portion 325c. The wire harness 333 is laid along the lower sides of those potions 325a to 325c, while extending extends the lamps 330 to 332 and the connector 336, whereby it is electrically connected to the lamps 330 to 332 and the like.

To assemble the lamps 330 to 332 and the like, and the wire harness 333 to the sub-frame 325, the wire harness 333 is first mounted on the wire harness 333, and then the lamps 330 to 332 and the like are mounted on the sub-frame 325, while being laid on the wire harness 333. Specifically, the lamps 330 to 332 and the like are assembled onto the sub-frame 325 in the following way.

Figure 31:
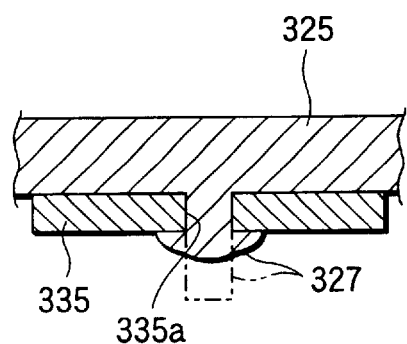
FIG. 31 is a longitudinal sectional view showing a structure for fixing a wire harness to a sub-frame.

In the present embodiment, the wire harness 333 is formed with a flat cable, and has mounting pieces 335 with through-holes 335a formed at proper locations. Protruded pieces 327, directed downwardly, are formed at locations of the sub-frame 325 corresponding to the mounting pieces 335, while being arranged along the extending path of the wire harness 333. The wire harness 333 is laid on the sub-frame 325 along a predetermined path. The protruded pieces 327 are inserted into the through-holes 335a of the mounting pieces 335. The protruded pieces 327 are caulked so as to firmly hold the mounting pieces 335, as shown in FIG. 31. Specifically, the tips of the protruded pieces 327 are heated and crushed, so that the wire harness 333 is fastened to the sub-frame 325. The method of fixing the wire harness 333 to the sub-frame 325 is not limited to the above-mentioned one. Instead of this method, other fixing methods may be used which use bolts, double-coated tape or adhesive.

Figure 32:
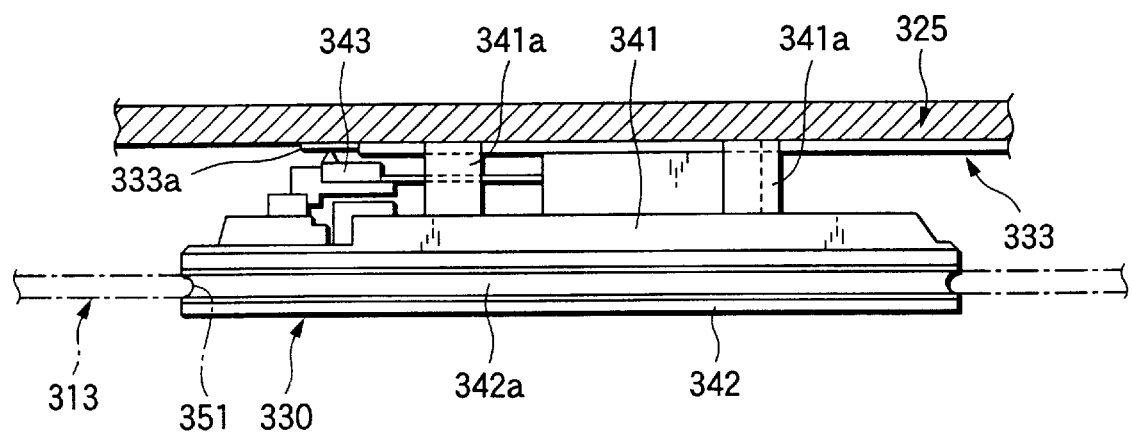
FIG. 32 is a side view (cross sectional view in part) showing a construction of a room lamp and a connection structure for electrically connecting the room lamp to the wire harness.

Meanwhile, the lamps 330 to 332 are fastened to the sub-frame 325 by means of bolts. This will be described in detail by using the room lamp 330 as a typical example. The room lamp 330, as shown in FIG. 32, comprises a main body 341 including a bulb, a switch circuit and others, and a lamp cover 342 mounted on the underside of the main body 341. A plurality of cylindrical ribs 341a are protruded from the surface of the main body 341 which is to be coupled to the sub-frame 325. The room lamp 330 is positioned at predetermined assembling positions of the sub-frame 325 by those cylindrical ribs 41a, while interposing the wire harness 333 located therebetween. In this state, bolts are applied from the underside of the room lamp 330 to the assembly through the cylindrical ribs 341a, so that the room lamp 330 is assembled to the sub-frame 325.

With regard to the electrical connection of the room lamp 330 to the wire harness 333, a terminal 343 like a plate spring is provided on the main body 341, as shown. An internal conductor 333a of the wire harness 333 is exposed at the mounting position of the room lamp 330. When the room lamp 330 is assembled to the sub-frame 325, the terminal 343 is brought into contact with the internal conductor 333a in a resilient manner. In this way, the room lamp 330 is electrically connected to the wire harness 333. Description is given here on the room lamp 330. The map lamp 331 and the vanity lamps 332 are also each constructed like the room lamp 330. The mounting of them onto the sub-frame 325 and the electrical connection of them to the wire harness 333 are carried out as in the case of the room lamp 330. The connector 336, while not illustrated in detail, will be described on its structure. The connector 336 is constructed such that a part of the connector is exposed to outside through the connection housing. The internal conductor 333a of the wire harness 333 is exposed at the mounting position of the connector 336. When the connector 336 is assembled to the sub-frame 325, the connector terminal comes in contact with the internal conductor 333a. As a result, the connector 336 is electrically connected to the wire harness 333.

The sun roof unit 312, as shown in FIG. 29, includes a frame 321. A sun roof 320 formed with smoke glass or the like is assembled to the frame 321, while being slidable. Further, a drive mechanism with a motor 322 as a drive source, which is for driving the roof or the like, is assembled to the frame 321. The sun roof unit is assembled to the upper surface of the sub-frame 325 of the sub-frame unit 311 by means of bolts or the like, although not illustrated.

A power source for driving the sun roof unit 312 and control signals to the same are applied thereto through the wire harness 333. The sun roof unit 312 and the wire harness 333 are electrically interconnected in the following way.

As shown in FIG. 30, the wire harness 333 includes a branch line 334, which is branched from the main line, at a location of its portion laid along the front portion 325a of the sub-frame 325. The branch line 334 is led to the upper surface of the sub-frame 325 through a cutout portion 328 of the front portion 325a. The internal conductor is exposed at this portion by removing the covering of this portion (see FIG. 33C). A plate-spring like terminal is provided on the surface of the sun roof unit 312 to be mounted on the sub-frame 325, as in the case of the room lamp 330. When the sun roof unit 312 is assembled to the upper surface of the sub-frame 325 as described above, the pressing contact terminal of the sun roof unit 312 comes in contact with the internal conductor of the branch line 334, so that the sun roof unit 312 is electrically connected to the wire harness 333.

The molded ceiling 313 is made of synthetic resin or the like. As shown in FIG. 29, an opening 350 for the sun roof is formed in the central portion of the molded ceiling. Openings 351 to 353 for the lamps, while corresponding to the lamps 330 to 332, are formed in the front and rear portions of the vehicle body 301 with respect to the sun-roof opening 350. The lamps 330 to 332 are inserted into the openings 351 to 353 from the upper side of the molded ceiling 313 such that those lamps are directed to the inside of the vehicle cabin. The lamp openings 351 to 353 of the molded ceiling 313 are fit to the recessed parts of the circumferential edges of the lamps 330 to 332, thereby making the ceiling portion look better.

This will be described in detail by using the room lamp 330 as a typical example. A groove 342a, which corresponds in size to a thickness of the molded ceiling 313, is formed on the circumference of the lamp cover 342 of the room lamp 330. As shown in FIG. 32, an opening 351 for the lamp of the molded ceiling 313 is formed, which the opening is slightly smaller the lamp cover 342. When the room lamp 330 is inserted into the opening 351 as described above, the circumferential edge of the opening 351 is fit to the groove 342a, and the circumferential edge is hidden within the groove 342a. As a result, the ceiling portion is attractive in appearance. Although not illustrated, the map lamp 331 and the vanity lamps 332 are also constructed like the room lamp (In the description to follow, the grooves of the map lamp 331 and the vanity lamps 332 are also designated by like reference numeral 342a.).

Work of assembling the thus constructed vehicle ceiling will be described with reference to FIGS. 33 and 34.

In the ceiling assembling work, the unit assembly 310 is constructed in advance.

Figure 33A:
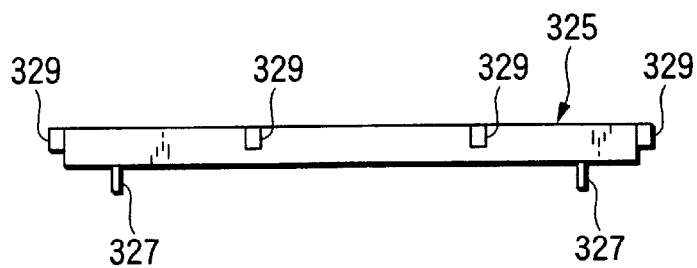
FIG. 33 is a process diagram useful in explaining a vehicular ceiling assembling structure.
Figure 33B:
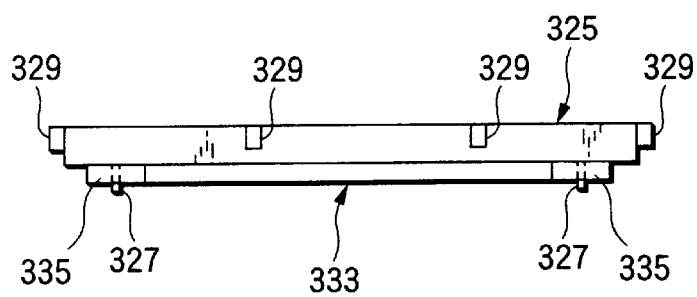
Figure 33C:
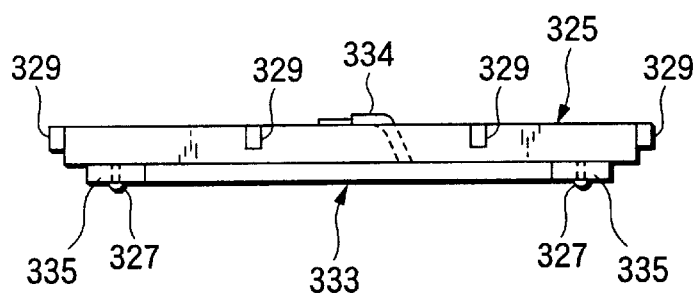

In assembling the unit assembly 310, as shown in FIGS. 33A and 33B, the wire harness 333 is laid on the underside of the sub-frame 325. The wire harness 333 is laid such that the wire harness 333 is placed on and along the sub-frame 325 while securing a predetermined path, and the protruded pieces 327 of the sub-frame 325 are inserted into the mounting pieces 335 of the wire harness 333 (FIG. 33C). In this case, the branch line 334 of the wire harness 333 is previously led to the upper side of the sub-frame 325. In the figure, reference numeral 329 indicates cylindrical ribs for assembling, which are used for assembling the unit assembly 310 to the body ceiling 302.

Figure 33D:
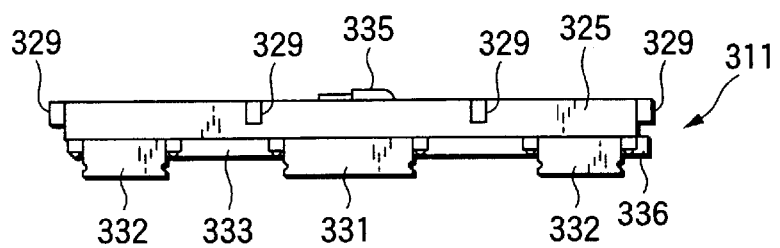

Then, as shown in FIG. 33D, the lamps 330 to 332 and the connector 336 are attached to predetermined positions on the underside of the sub-frame. When the lamps 330 to 332 and the connector 336 are thus attached to the sub-frame, the terminals of the lamps 330 to 332 are brought into contact with the internal conductor of the wire harness 333. As a result, the lamps 330 to 332 are electrically connected to the wire harness 333. Here, the assembling work of a sub-frame unit 311 is completed. It is suggestible to assemble the sub-frame unit 311 in the following manner. A mounting pieces 335 is placed upside down on a worktable or the like. In this state it is fixed thereon. Then, a wire harness 333 is laid and the lamps 330 to 332 are assembled thereto. By so doing, the worker can assemble them in an easy position and efficiently.

Figure 33E:
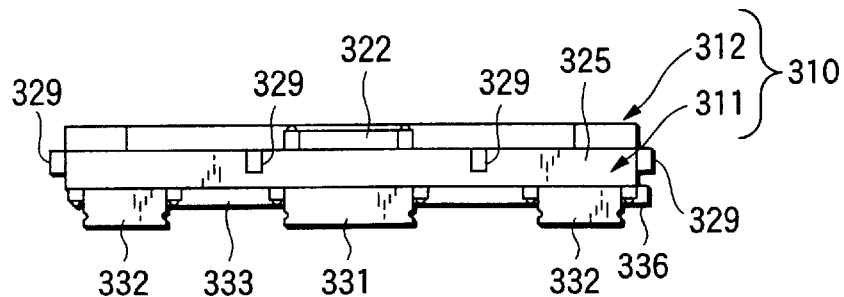

Following the completion of the sub-frame unit 311, as shown in FIG. 33E, the sun roof unit 312 already assembled is assembled to the upper surface of the sub-frame of the sub-frame unit 311. When the sun roof unit 312 is thus assembled to the sub-frame unit, the pressing-contact terminal is brought into contact with the internal conductor of the wire harness 333 (branch line 334), as described above. As a result, the sun roof unit 312 is electrically connected to the wire harness 333. Here, a unit assembly 310 is completed.

Figure 34A:
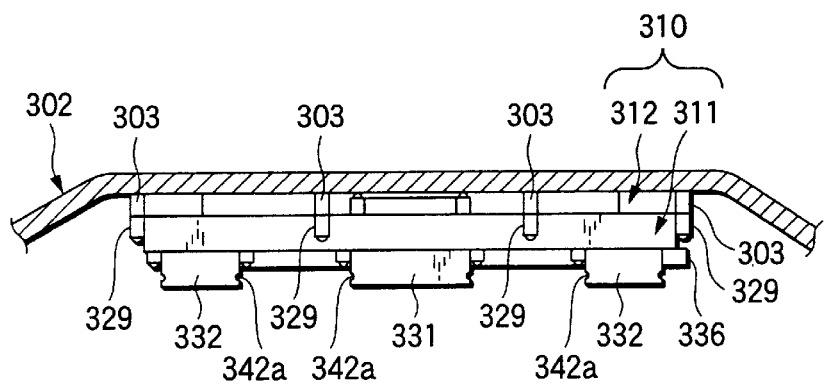
FIG. 34 is another process diagram useful in explaining a vehicular ceiling assembling structure.

In the work (main work) of assembling the vehicle ceiling to the vehicle body, the unit assembly 310 already assembled as described above is assembled to the body ceiling 302 as shown in FIG. 34A. Specifically, the unit assembly 310 is positioned to a predetermined location of the body ceiling 302, and fastened to fixing portions 303 of the body ceiling 302 by means of bolts, with the aid of assembling ribs 329.

Figure 34B:
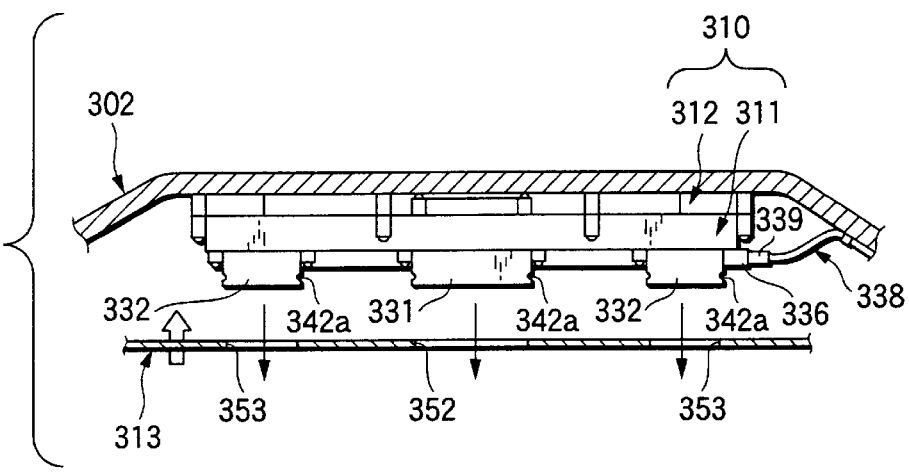

Subsequently, as shown in FIG. 34B, a wire harness 338 for the vehicle cabin is laid along the front pillars of the vehicle body 301, and a connector 339 for connection of the wire harness 338 is coupled to the connector 336 of the unit assembly 310. The wire harness 338 may be laid before the unit assembly 310 is assembled to the body ceiling 302.

Figure 34C:
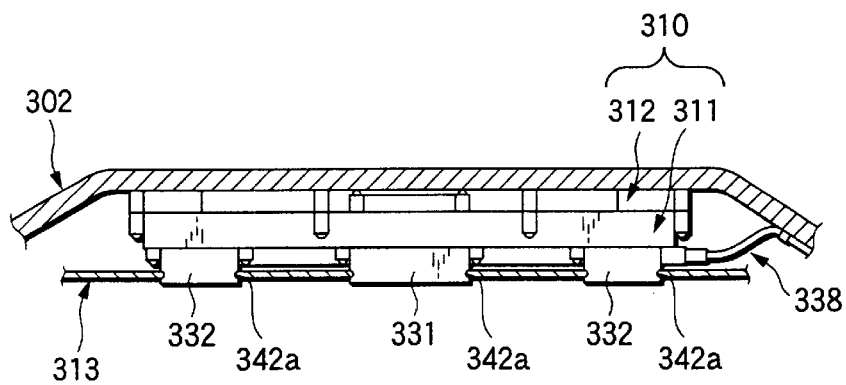

Then, the molded ceiling 313 is laid on the underside of the unit assembly 310 and those are fastened together by means of bolts. As shown in FIG. 34C, the lamps 330 to 332 are directed to the inside (lower side in the figure) of the vehicle cabin through the lamp openings 351 to 353, which are formed in the molded ceiling 313. At this time, the lamp cover 342 for the lamps 330 to 332, as described above, are fit to the lamp openings 351 to 353, respectively, whereby the circumferential edges of the lamp openings 351 to 353 are fit to the grooves 342a of the lamp cover 342. As a result, the opening circumferential edges are hidden. This fitting work is done in the following manner. The circumferential edges of the lamp openings 351 to 353 are hooked to parts of the grooves 342a of the lamp cover 342, the circumferential edges of the lamp openings 351 to 353 are fit into the entire grooves 42a while expanding the lamp openings 351 to 353 by pulling the molded ceiling 313. This work may easily be done since the molded ceiling 313 is made of the synthetic fibers or the like, as described above.

After the assembling work for the molded ceiling 313 is completed, the sun visors 314 and the assist grips 315 are fastened to the body ceiling 302 by means of bolts from the outer side (facing the inner side of the vehicle cabin) of the molded ceiling 313. Here, the assembling work of the vehicle ceiling to the vehicle body is completed.

As described above, in the assembling structure of the vehicle ceiling, the lamps 330 to 332 may be assembled to the body ceiling 302 before the assembling of the molded ceiling 313. Further, the circumferential edges of the lamp openings 351 to 353 are hidden to present a good appearance of the ceiling portion.

Therefore, in the vehicle ceiling assembling process, the workers are released from the conventional troublesome work: The wire harness is taken pout through the opening of the molded ceiling, the lamps and the wire harness are connected by using of the connectors, and the lamps are assembled to the body ceiling through the opening. Accordingly, the assembling work of the lamps 330 to 332 is improved in efficiency. Particularly, in the embodiment, the unit assembly 310 into which the lamps 330 to 332 and the wire harness 333 have been assembled is prepared. In the vehicle ceiling assembling process, the unit assembly 310 is assembled to the body ceiling 302. The lamps 330 to 332 are assembled to the body ceiling 302 by one assembling work. Therefore, the assembling work of the plurality of the lamps 330 to 332 is remarkably improved in efficiency.

The electrical connection of the lamps 330 to 332 and the wire harness 333 may be performed before the assembling of the molded ceiling 313, as described above. Therefore, the work of electrically connecting the lamps 330 to 332 and the wire harness 333 is done more accurately and reliably than the conventional connection work in which the worker must take an upward facing posture. As a result, the assembling defect, such as poor contact, is effectively prevented.

Further, in assembling the lamps, there is no need of taking out the wire harness through the opening of the molded ceiling. Accordingly, the take-out part is not required to provide on the wire harness, whereas it is indispensably provided in the conventional technique. Therefore, there is no chance that during the running of the vehicle, the take-out part vibrates to generate abnormal sound. Further, it never happens that the take-out part bites the wire harness in assembling the lamps to the body ceiling.

In the embodiment, the groove 342a to which the molded ceiling is fit is formed in the lamp cover 342 of the room lamp 330. Alternatively, the molded-ceiling fitting groove may be formed on the circumference of the main body 341 of the room lamp 330, for example. In this case, the circumferential edge of the opening 351 of the molded ceiling 313 is fit to the groove.

The lamps 330 to 332 maybe constructed as described below. This will be described by using the room lamp 330 as a typical example.

Figure 35:
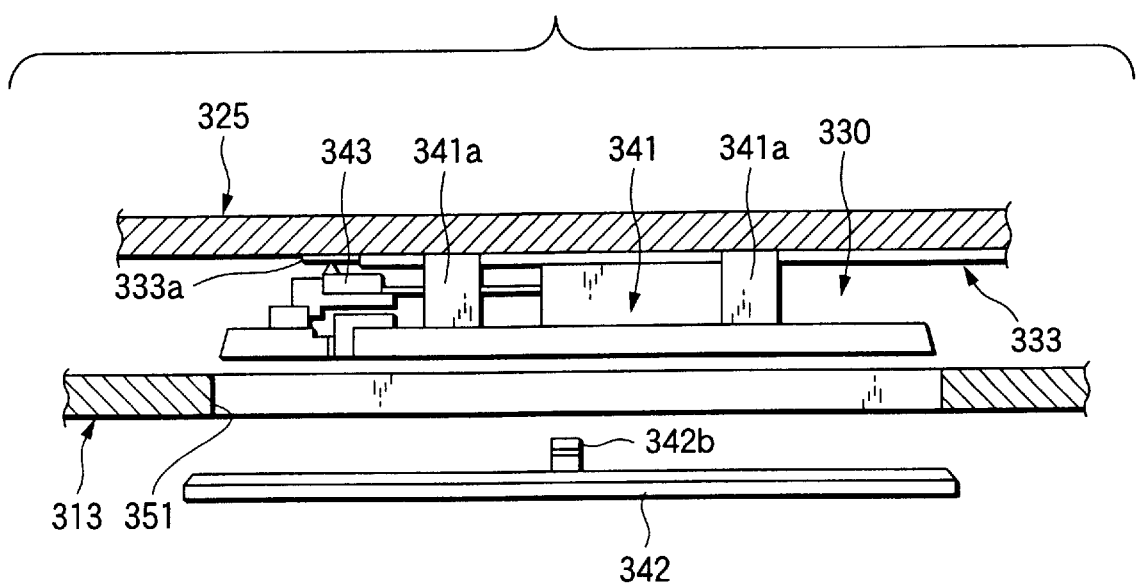
FIG. 35 is a side view (cross sectional view in part; before the assembling is completed) showing a modification of a room lamp and a relationship between the room lamp and a molded ceiling.

As shown in FIG. 35, the main body 341 of the room lamp 330 and the lamp cover 342 are arranged such that those are detachable one from the other. The main body 341 is smaller than the lamp opening 351 of the molded ceiling 313. The lamp cover 342 is larger than that of the opening 351. A hook 342b provided on the lamp cover 342 is brought into engagement with an engaging portion (not shown) of the main body 341, through the lamp opening 351 of the molded ceiling 313. As a result, the lamp cover 342 is mounted on the main body 341. The room lamp 330 of the alternative is thus constructed. In this case, as shown, the lamp cover 342 is mounted on the main body 341 such that the main body 341 faces the lamp opening 351 of the molded ceiling 313, and the lamp cover 342 is brought into close contact with the main body 341. A cover lens 342 is fastened to the main body 341 by means of bolts.

The construction of the room lamp 330 also produces the useful effects comparable with those by the room lamp 330 having the construction shown in FIG. 32.

Figure 36:
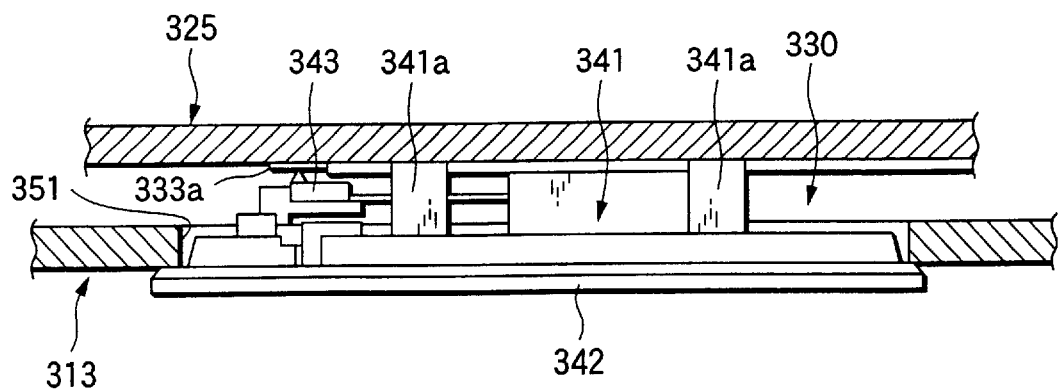
FIG. 36 is a side view (cross sectional view in part; after the assembling is completed) showing the modification of a room lamp and a relationship between the room lamp and a molded ceiling.

The vehicle-ceiling assembling process is progressively carried out up to the step of assembling the molded ceiling 313 according to the process shown in FIGS. 33 and 34 in a state that the lamp cover 342 is removed. Thereafter, as shown in FIG. 36, the lamp cover 342 is mounted on the main body 341 through the opening 351 from the under side of the molded ceiling 313. With such a structure, the circumferential edge of the lamp opening 351 is hidden by the lamp cover 342 since the lamp cover 342 is larger than the lamp opening 351. As a result, the ceiling portion is kept good in its appearance.

Accordingly, the assembling of the main body 341 to the body ceiling 302 and the electrical connection of it to the wire harness 333 may be done before the assembling of the molded ceiling 313. By so doing, the workability in assembling the room lamp 330 is improved as in the room lamp 330 having the construction shown in FIG. 32. The electrical connection of the room lamp 330 to the wire harness 333 can be performed accurately and reliably.

The construction of the room lamp 330 shown in FIGS. 36 may be modified as follows. The main body 341 of the room lamp 330 is selected to be larger than the lamp opening 351. The hook 342b and the engaging portion of the main body are arranged so as to allow the lamp cover 342 to be mounted on the main body 341 through the lamp opening 351. With the structure, the circumferential edge of the lamp opening 351 of the molded ceiling 313 is sandwiched between the lamp cover 342 and the main body 341.

Figure 37:
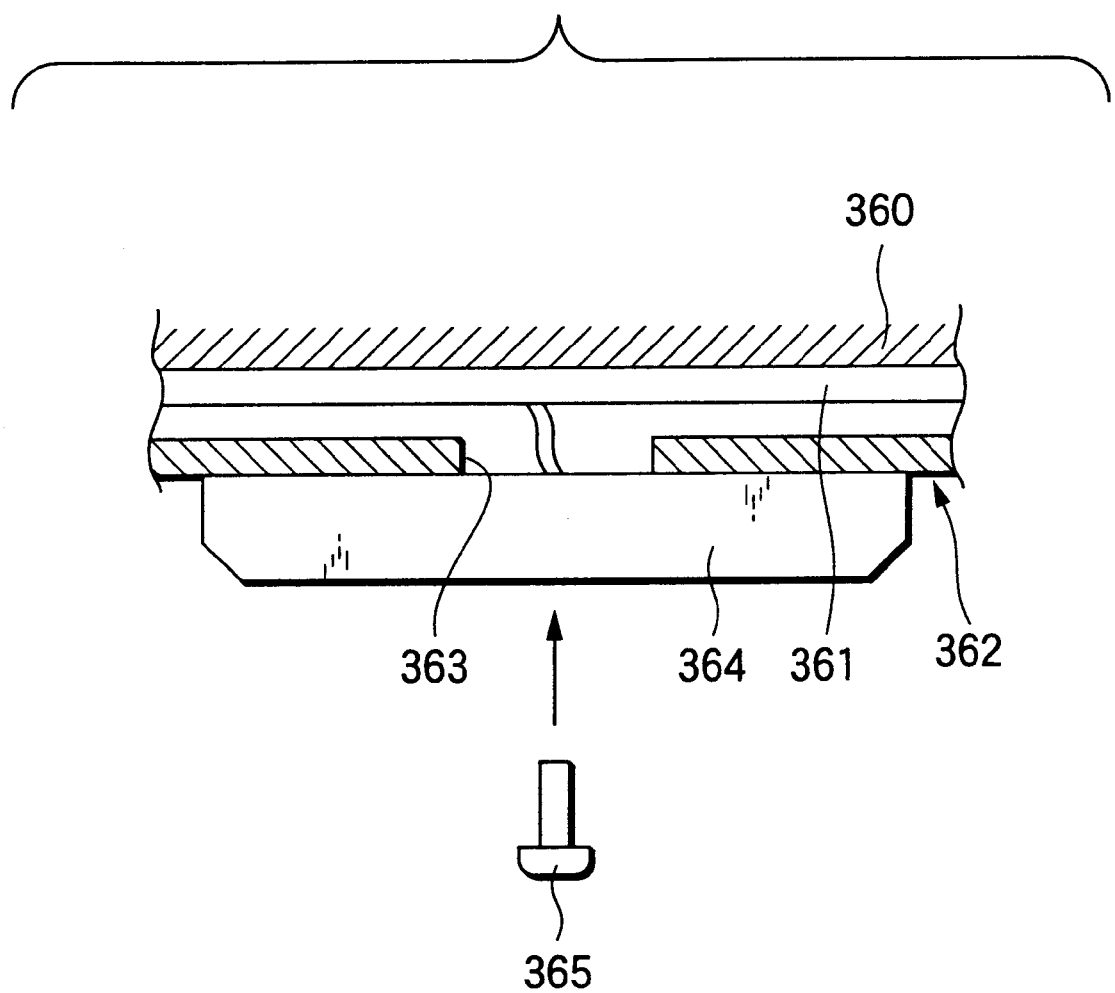
FIG. 37 is a cross sectional view showing a conventional vehicular ceiling assembling structure.

In the construction of the room lamp 330 shown in FIGS. 36 and 37, the lamp opening 351 of the molded ceiling 313 is covered with the lamp cover 342 which entirely covers the main body 341 from the under side. In a case where an annular style cover fringing the lamp is mounted on the lower end of the main body 341, and the lamp cover is fit to the inner portion of the style cover, the circumferential edge of the lamp opening 351 may be covered with the style cover by mounting the style cover onto the main body 341 through the lamp opening 351 from the under side of the molded ceiling 313.

While the construction shown in FIGS. 36 and 37 is that of the room lamp 330, other lamps, the map lamp 331 and the vanity lamps 332, may also be constructed as of the room lamp.

In the embodiment mentioned above, the assembling structure of the vehicle ceiling is such that the respective lamps 330 to 332 are assembled to the body ceiling 302, through the sub-frame 325. It is readily understood that the assembling structure of the vehicle ceiling may be modified such that the lamps 330 to 332 are directly assembled to the body ceiling 302.

An assembling structure of the vehicle ceiling of the present invention is constructed such that a specific portion of each illuminating device assembled onto the underside of a body ceiling of a vehicle body is fit to an opening while facing the under side of a molded ceiling, and an opening of the molded ceiling is fit to a groove formed in and along the circumference of the specific portion of the illuminating device, whereby the opening is hidden. With such a structure, the illuminating device may be assembled before the assembling of the molded ceiling. Further, the outer appearance of the ceiling portion may be kept attractive. The wire harness is taken out through the opening of the molded ceiling, and the illuminating device is connected to the wire hardness by the connector. Additionally, the workability in the assembling of the illuminating device is improved when comparing with the conventional illuminating device of the type in which the illuminating device must be assembled to the body ceiling through the opening. Further, the work of electrically connecting the illuminating device to the wire harness is done accurately and reliably.

Further, in assembling the lamps, there is no need of taking out the wire harness through the opening of the molded ceiling. Accordingly, the take-out part is not required to provide on the wire harness, whereas it is indispensably provided in the conventional technique. Therefore, there is no chance that during the running of the vehicle, the take-out part vibrates to generate abnormal sound. Further, it never happens that the take-out part bites the wire harness in assembling the lamps to the body ceiling.

In a vehicular ceiling assembling structure of the invention, an illuminating device comprises a main body to be assembled to a body ceiling and a cover mounted on the lower end of the main body. The cover is mounted onto the main body through the opening formed in the molded ceiling, from the under side of the molded ceiling, whereby the opening is hidden. Therefore, the main body of the illuminating device may be assembled to the body ceiling before the assembling of the molded ceiling. Further, the external appearance of the ceiling portion may be kept good. Therefore, the workability in the assembling of the illuminating device is improved as in the above-mentioned illuminating device. Further, the work of electrically connecting the illuminating device to the wire harness is done accurately and reliably.

What is claimed is:

1. A vehicular ceiling assembling structure for assembling one or more electric devices and an interior ceiling onto a body ceiling of a vehicle body, wherein a frame member to which one or more electric devices and a wire harness for the one or more electric devices are assembled is mounted on the underside of said body ceiling, and said interior ceiling is mounted on said body ceiling in a state that said interior ceiling is disposed under said frame member and said wire harness is between said frame member and said interior ceiling.

2. The vehicular ceiling assembling structure according to claim 1, wherein said frame member is entirely a thin plate.

3. The vehicular ceiling assembling structure according to claim 1, wherein said one or more electric devices include a sun roof unit including a sun roof and a drive mechanism for the sun roof.

4. The vehicular ceiling assembling structure according to claim 3, wherein said frame member comprises:
a front portion extending in the widthwise direction of a vehicle body in the vicinity of the front pillars of said body ceiling,
a pair of side portions extending toward the rear side of said vehicle body from respective ends of said front portion as viewed in said widthwise direction, and
a center portion for coupling together said pair of side portions at a mid position as viewed in the longitudinal direction of said vehicle body, wherein an opening for said sun roof is defined by said front portion, said side portions and said center portion, a map lamp is assembled as a first said electric device to said front portion, and a room lamp is assembled as a second said electric device to said center portion.

5. The vehicular ceiling assembling structure according to claim 4, wherein said center portion is detachable from said side portions, and attachable to said side portions at a plurality of positions as viewed in the longitudinal direction of said vehicle body.

6. The vehicular ceiling assembling structure according to claim 1, wherein a wire harness comprising a flat cable is laid as said wire harness on said frame member, internal conductors of said flat cable are exposed at positions where said one or more electric devices are assembled, said one or more electric devices are provided with plate-spring terminals, and said terminals come into resilient contact with said internal conductors of said flat cable at said positions where said internal conductors are exposed.

7. The vehicular ceiling assembling structure according to claim 1, wherein grooves in which electric wires forming said wire harness are to be put are formed in said frame member, and
said wire harness is laid on said frame member by putting said electric wires into said grooves.

8. The vehicular ceiling assembling structure according to claim 1, wherein grooves in which electric wires forming said wire harness are to be put are formed in said frame member, press contacting blades to be inserted into said grooves are provided in said one or more electric devices, and
said one or more electric devices are pressingly connected to said electric wires of said wire harness when said electric wires are laid along and in said grooves in a state that said one or more electric devices are assembled into said frame member.

9. A unit assembly to be assembled to a body ceiling of a vehicle body, wherein one or more electric devices and a wire harness for said one or more electric devices, which are to be assembled to said body ceiling, are assembled to a frame member which may be assembled to said body ceiling in a state that said one or more electric devices and said wire harness are electrically connected to each other, and said one or more electric devices and said wire harness are disposed a predetermined positions on said body ceiling by assembling said frame member to a predetermined position of said body ceiling, and the one or more electric devices include a sun roof unit including a sun roof and a drive mechanism for the sun roof.

10. An assembly medium for assembling electric devices and a wire harness connected to the electric devices on a body ceiling of a vehicle body, the assembly medium including a frame member, wherein the frame member comprises:

a front portion extending in the widthwise direction of a vehicle body in a vicinity of front pillars of said body ceiling in a state that said front portion is assembled to said body ceiling, a pair of side portions extending toward the rear side of said vehicle body from respective ends of said front portion as viewed in said widthwise direction but not extending an entire length of said body ceiling, and a center portion coupling together said pair of side portions at a mid position as viewed in the longitudinal direction of said vehicle body, wherein the frame member includes a plurality of electric device support points that support a respective plurality of electric devices.

11. The frame member according claim 10, wherein said frame member is entirely a thin plate.

12. The frame member according to claim 10, wherein said center portion is detachable from said side portions, and attachable to said side portions at a plurality of positions as viewed in the longitudinal direction of said vehicle body.

13. A vehicular ceiling assembling method for assembling one or more electric devices and an interior ceiling onto a body ceiling of a vehicle body, comprising the steps of:

assembling one or more electric devices and a wire harness for the one or more electric devices to a frame member which may be assembled to said body ceiling;

electrically connecting said one or more electric devices and said wire harness;

assembling said frame member to said body ceiling, whereby said frame member and said wire harness are assembled to said body ceiling; and disposing an interior ceiling under said frame member and assembling said interior ceiling to said body ceiling after assembling said frame member to said body ceiling.

14. The vehicular ceiling assembling structure according to claim 13, wherein said one or more electric devices include a sun roof unit including a sun roof and a drive mechanism for the sun roof.

15. The vehicular ceiling assembling structure according to claim 13, wherein said one or more electric devices are assembled to the underside of said frame member, whereby press contacting blades provided on said electric devices are passed through said frame member while being directed upward, and in laying said wire harness onto said frame member, electric wires forming said wire harness are pressingly connected to said press contacting blades.

16. A vehicular ceiling assembling structure in which an illuminating device and an interior ceiling are assembled onto the underside of a body ceiling of a vehicle body and said illuminating device faces the underside of said interior ceiling, wherein said opening of said interior ceiling is slightly smaller than a specific portion of said illuminating device, and the circumferential edge of said opening is fit to a groove formed in and along the circumference of said specific portion of said illuminating device.

17. The vehicular ceiling assembling structure according to claim 16, wherein said illuminating device comprises a main body to be assembled to said body ceiling and a cover coupled to the lower end of said main body, and said groove is formed in said cover.

18. A vehicular ceiling assembling method for assembling an illuminating device and an interior ceiling onto the underside of a body ceiling of a vehicle body, wherein said illuminating device and a wire harness for said illuminating device are assembled onto said body ceiling, thereby electrically connecting said illuminating device to said wire harness, thereafter said interior ceiling is located under said assembled illuminating device and wire harness, and a specific portion of said illuminating device is fit to an opening formed in said interior ceiling, whereby said specific portion faces the underside of said interior ceiling, and said opening of said interior ceiling is fit into a groove formed in and along the circumference of said specific portion of said illuminating device.

19. A vehicular ceiling assembling method for assembling an illuminating device and an interior ceiling onto the underside of a body ceiling of a vehicle body, wherein a main body of said illuminating device and a wire harness for said illuminating device are assembled onto said body ceiling, thereby electrically connecting said illuminating device to said wire harness, thereafter said interior ceiling is located under said assembled main body and wire harness, and assembled onto said body ceiling, and a cover larger than said opening is coupled to said main body from the underside of said interior ceiling, through an opening formed in said interior ceiling.

20. The vehicular ceiling assembling structure according to claim 1, wherein said interior ceiling is a molded ceiling.

21. The vehicular ceiling assembling method according to claim 13, wherein said interior ceiling is a molded ceiling.

22. The vehicular ceiling assembling structure according to claim 16, wherein said interior ceiling is a molded ceiling.

23. The vehicular ceiling assembling method according to claim 18, wherein said interior ceiling is a molded ceiling.

24. The vehicular ceiling assembling method according to claim 19, wherein said interior ceiling is a molded ceiling.

* * * * *